United States Patent
Freydina et al.

(10) Patent No.: US 8,585,882 B2
(45) Date of Patent: Nov. 19, 2013

(54) SYSTEMS AND METHODS FOR WATER TREATMENT

(75) Inventors: Evgeniya Freydina, Acton, MA (US); Joseph D. Gifford, Marlborough, MA (US)

(73) Assignee: Siemens Water Technologies LLC, Alpharetta, GA (US)

( * ) Notice: Subject to any disclaimer, the term of this patent is extended or adjusted under 35 U.S.C. 154(b) by 377 days.

(21) Appl. No.: 12/744,785

(22) PCT Filed: Dec. 1, 2008

(86) PCT No.: PCT/US2008/013286
§ 371 (c)(1),
(2), (4) Date: Mar. 8, 2011

(87) PCT Pub. No.: WO2009/073175
PCT Pub. Date: Jun. 11, 2009

(65) Prior Publication Data
US 2011/0162964 A1    Jul. 7, 2011

Related U.S. Application Data

(60) Provisional application No. 60/991,316, filed on Nov. 30, 2007.

(51) Int. Cl.
*B01D 61/48* (2006.01)
*B01D 61/42* (2006.01)
*B01D 61/44* (2006.01)
*C02F 1/42* (2006.01)
*C02F 1/46* (2006.01)
*C02F 1/58* (2006.01)

(52) U.S. Cl.
USPC ........... 204/534; 204/522; 204/537; 204/631; 204/633

(58) Field of Classification Search
USPC ................ 204/520, 522–524, 529, 534, 537; 205/627, 628, 630–634, 660, 661
See application file for complete search history.

(56) References Cited

U.S. PATENT DOCUMENTS

| | | | |
|---|---|---|---|
| 2,514,415 | A | 7/1950 | Rasch |
| 2,535,035 | A | 12/1950 | Briggs |
| 2,681,319 | A | 6/1954 | Bodamer |

(Continued)

FOREIGN PATENT DOCUMENTS

| | | |
|---|---|---|
| AU | 18629/92 A | 10/1992 |
| CA | 2316012 A1 | 2/2001 |

(Continued)

OTHER PUBLICATIONS

"Affordable Desalination Sets Low Energy Record," press release, http://www.affordableseal.com/home/news/ADC%20Sets%20Low%20Energy%205-8-06.pdf, May 4, 2006, printed on Apr. 16, 2008.

(Continued)

*Primary Examiner* — Keith Hendricks
*Assistant Examiner* — Salil Jain

(57) ABSTRACT

Electrochemical devices and methods for water treatment are disclosed. An electrodeionization device (100) may include one or more compartments (110) containing an ionselective media, such as boron-selective resin (170). Cyclic adsorption of target ions and regeneration of the media in-situ is used to treat process water, and may be driven by the promotion of various pH conditions within the electrochemical device.

22 Claims, 6 Drawing Sheets

(56) References Cited

U.S. PATENT DOCUMENTS

| | | |
|---|---|---|
| 2,681,320 A | 6/1954 | Bodamer |
| 2,788,319 A | 4/1957 | Pearson |
| 2,794,777 A | 6/1957 | Pearson |
| 2,815,320 A | 12/1957 | Kollsman |
| 2,854,394 A | 9/1958 | Kollsman |
| 2,923,674 A | 2/1960 | Kressman |
| 2,943,989 A | 7/1960 | Kollsman |
| 3,014,855 A | 12/1961 | Kressman |
| 3,074,864 A | 1/1963 | Gaysowski |
| 3,099,615 A | 7/1963 | Kollsman |
| 3,148,687 A | 9/1964 | Dosch |
| 3,149,061 A | 9/1964 | Parsi |
| 3,149,062 A | 9/1964 | Gottschal |
| 3,165,460 A | 1/1965 | Zang |
| 3,216,920 A | 11/1965 | Nellen |
| 3,223,612 A | 12/1965 | Chen et al. |
| 3,291,713 A | 12/1966 | Parsi |
| 3,330,750 A | 7/1967 | McRae et al. |
| 3,341,441 A | 9/1967 | Giuffrida et al. |
| 3,375,182 A | 3/1968 | Chen |
| 3,375,208 A | 3/1968 | Duddy |
| 3,627,703 A | 12/1971 | Kojima et al. |
| 3,630,378 A | 12/1971 | Bauman |
| 3,639,231 A | 2/1972 | Bresler |
| 3,645,884 A | 2/1972 | Gilliland |
| 3,686,089 A | 8/1972 | Korngold |
| 3,755,135 A | 8/1973 | Johnson |
| 3,869,375 A | 3/1975 | Ono et al. |
| 3,869,376 A | 3/1975 | Tejeda |
| 3,870,033 A | 3/1975 | Faylor et al. |
| 3,876,565 A | 4/1975 | Takashima et al. |
| 3,989,615 A | 11/1976 | Kiga et al. |
| 4,032,452 A | 6/1977 | Davis |
| 4,033,850 A | 7/1977 | Kedem et al. |
| 4,089,758 A | 5/1978 | McAloon |
| 4,102,752 A | 7/1978 | Rugh, II |
| 4,116,889 A | 9/1978 | Chlanda et al. |
| 4,119,581 A | 10/1978 | Rembaum et al. |
| 4,130,473 A | 12/1978 | Eddleman |
| 4,153,761 A | 5/1979 | Marsh |
| 4,167,551 A | 9/1979 | Tamura et al. |
| 4,191,811 A | 3/1980 | Hodgdon |
| 4,197,206 A | 4/1980 | Karn |
| 4,202,772 A | 5/1980 | Goldstein |
| 4,216,073 A | 8/1980 | Goldstein |
| 4,217,200 A | 8/1980 | Kedem et al. |
| 4,226,688 A | 10/1980 | Kedem et al. |
| 4,228,000 A | 10/1980 | Hoeschler |
| 4,294,933 A | 10/1981 | Kihara et al. |
| 4,298,442 A | 11/1981 | Giuffrida |
| 4,321,145 A | 3/1982 | Carlson |
| 4,330,654 A | 5/1982 | Ezzell et al. |
| 4,342,651 A | 8/1982 | Ahrens |
| 4,358,545 A | 11/1982 | Ezzell et al. |
| 4,374,232 A | 2/1983 | Davis |
| 4,430,226 A | 2/1984 | Hegde et al. |
| 4,465,573 A | 8/1984 | O'Hare |
| 4,473,450 A | 9/1984 | Nayak et al. |
| 4,505,797 A | 3/1985 | Hodgdon et al. |
| 4,569,747 A | 2/1986 | Kedem et al. |
| 4,574,049 A | 3/1986 | Pittner |
| 4,599,178 A | 7/1986 | Blytas |
| 4,610,790 A | 9/1986 | Reti et al. |
| 4,614,576 A | 9/1986 | Goldstein |
| 4,632,745 A | 12/1986 | Giuffrida et al. |
| 4,636,296 A | 1/1987 | Kunz |
| 4,655,909 A | 4/1987 | Furuno |
| 4,661,411 A | 4/1987 | Martin et al. |
| 4,671,863 A | 6/1987 | Tejeda |
| 4,687,561 A | 8/1987 | Kunz |
| 4,702,810 A | 10/1987 | Kunz |
| 4,707,240 A | 11/1987 | Parsi et al. |
| 4,747,929 A | 5/1988 | Siu et al. |
| 4,747,955 A | 5/1988 | Kunin |
| 4,751,153 A | 6/1988 | Roth |
| 4,753,681 A | 6/1988 | Giuffrida et al. |
| 4,770,756 A | 9/1988 | Cawlfield et al. |
| 4,770,793 A | 9/1988 | Treffry-Goatley et al. |
| 4,775,480 A | 10/1988 | Milton et al. |
| 4,784,741 A | 11/1988 | Boulton et al. |
| 4,804,451 A | 2/1989 | Palmer |
| 4,806,244 A | 2/1989 | Guilhem |
| 4,808,287 A | 2/1989 | Hark |
| 4,830,721 A | 5/1989 | Bianchi et al. |
| 4,832,804 A | 5/1989 | Brattan |
| 4,849,102 A | 7/1989 | Latour et al. |
| 4,871,431 A | 10/1989 | Parsi |
| 4,872,888 A | 10/1989 | Ehrfeld et al. |
| 4,872,958 A | 10/1989 | Suzuki et al. |
| 4,880,511 A | 11/1989 | Sugita |
| 4,892,632 A | 1/1990 | Morris |
| 4,894,128 A | 1/1990 | Beaver |
| 4,898,653 A | 2/1990 | Morris |
| 4,915,803 A | 4/1990 | Morris |
| 4,925,541 A | 5/1990 | Giuffrida et al. |
| 4,931,160 A | 6/1990 | Giuffrida |
| 4,940,518 A | 7/1990 | Morris |
| 4,956,071 A | 9/1990 | Giuffrida et al. |
| 4,964,970 A | 10/1990 | O'Hare |
| 4,969,983 A | 11/1990 | Parsi |
| 4,983,267 A | 1/1991 | Moeglich et al. |
| 4,999,107 A | 3/1991 | Guerif |
| 5,026,465 A | 6/1991 | Katz et al. |
| 5,030,672 A | 7/1991 | Hann et al. |
| 5,032,265 A | 7/1991 | Jha et al. |
| 5,066,375 A | 11/1991 | Parsi et al. |
| 5,066,402 A | 11/1991 | Anselme et al. |
| 5,073,268 A | 12/1991 | Saito et al. |
| 5,082,472 A | 1/1992 | Mallouk et al. |
| 5,084,148 A | 1/1992 | Kazcur et al. |
| 5,092,970 A | 3/1992 | Kaczur et al. |
| 5,106,465 A | 4/1992 | Kaczur et al. |
| 5,116,509 A | 5/1992 | White |
| 5,120,416 A | 6/1992 | Parsi et al. |
| 5,126,026 A | 6/1992 | Chlanda |
| 5,128,043 A | 7/1992 | Wildermuth |
| 5,154,809 A | 10/1992 | Oren et al. |
| 5,166,220 A | 11/1992 | McMahon |
| 5,176,828 A | 1/1993 | Proulx |
| 5,185,048 A | 2/1993 | Guerif |
| 5,192,432 A | 3/1993 | Andelman |
| 5,196,115 A | 3/1993 | Andelman |
| 5,203,976 A | 4/1993 | Parsi et al. |
| 5,211,823 A | 5/1993 | Giuffrida et al. |
| 5,223,103 A | 6/1993 | Kazcur et al. |
| H1206 H | 7/1993 | Thibodeaux et al. |
| 5,227,040 A | 7/1993 | Simons |
| 5,240,579 A | 8/1993 | Kedem |
| 5,244,579 A | 9/1993 | Horner et al. |
| 5,254,227 A | 10/1993 | Cawlfield et al. |
| 5,254,257 A | 10/1993 | Brigano et al. |
| 5,259,936 A | 11/1993 | Ganzi |
| 5,286,354 A | 2/1994 | Bard et al. |
| 5,292,422 A | 3/1994 | Liang et al. |
| 5,308,466 A | 5/1994 | Ganzi et al. |
| 5,308,467 A | 5/1994 | Sugo et al. |
| 5,316,637 A | 5/1994 | Ganzi et al. |
| 5,342,521 A | 8/1994 | Bardot et al. |
| 5,344,566 A | 9/1994 | Clancey |
| 5,346,624 A | 9/1994 | Libutti et al. |
| 5,346,924 A | 9/1994 | Giuffrida |
| 5,356,849 A | 10/1994 | Matviya et al. |
| 5,358,640 A | 10/1994 | Zeiher et al. |
| 5,364,439 A | 11/1994 | Gallup et al. |
| 5,376,253 A | 12/1994 | Rychen et al. |
| 5,397,445 A | 3/1995 | Umemura et al. |
| 5,411,641 A | 5/1995 | Trainham, III et al. |
| 5,415,786 A | 5/1995 | Martin et al. |
| 5,423,965 A | 6/1995 | Kunz |
| 5,425,858 A | 6/1995 | Farmer |
| 5,425,866 A | 6/1995 | Sugo et al. |
| 5,434,020 A | 7/1995 | Cooper |
| 5,444,031 A | 8/1995 | Hayden |
| 5,451,309 A | 9/1995 | Bell |

(56) References Cited

U.S. PATENT DOCUMENTS

| | | |
|---|---|---|
| 5,458,781 A | 10/1995 | Lin |
| 5,458,787 A | 10/1995 | Rosin et al. |
| 5,460,725 A | 10/1995 | Stringfield |
| 5,460,728 A | 10/1995 | Klomp et al. |
| 5,489,370 A | 2/1996 | Lomasney et al. |
| 5,503,729 A | 4/1996 | Elyanow et al. |
| 5,518,626 A | 5/1996 | Birbara et al. |
| 5,518,627 A | 5/1996 | Tomoi et al. |
| 5,536,387 A | 7/1996 | Hill et al. |
| 5,538,611 A | 7/1996 | Otowa |
| 5,538,655 A | 7/1996 | Fauteux et al. |
| 5,539,002 A | 7/1996 | Watanabe |
| 5,547,551 A | 8/1996 | Bahar et al. |
| 5,558,753 A | 9/1996 | Gallagher et al. |
| 5,580,437 A | 12/1996 | Trainham, III et al. |
| 5,584,981 A | 12/1996 | Turner et al. |
| 5,593,563 A | 1/1997 | Denoncourt et al. |
| 5,599,614 A | 2/1997 | Bahar et al. |
| 5,635,071 A | 6/1997 | Al-Samadi |
| 5,670,053 A | 9/1997 | Collentro et al. |
| 5,679,228 A | 10/1997 | Elyanow et al. |
| 5,679,229 A | 10/1997 | Goldstein et al. |
| 5,681,438 A | 10/1997 | Proulx |
| 5,714,521 A | 2/1998 | Kedem et al. |
| 5,716,531 A | 2/1998 | Kenley et al. |
| RE35,741 E | 3/1998 | Oren et al. |
| 5,733,602 A | 3/1998 | Hirose et al. |
| 5,736,023 A | 4/1998 | Gallagher et al. |
| 5,759,373 A | 6/1998 | Terada et al. |
| 5,762,421 A | 6/1998 | Ross |
| 5,762,774 A | 6/1998 | Tessier |
| 5,766,479 A | 6/1998 | Collentro et al. |
| 5,788,826 A | 8/1998 | Nyberg |
| 5,804,055 A | 9/1998 | Coin et al. |
| 5,811,012 A * | 9/1998 | Tanabe et al. ............... 210/669 |
| 5,814,197 A | 9/1998 | Batchelder et al. |
| 5,837,124 A | 11/1998 | Su et al. |
| 5,858,191 A | 1/1999 | DiMascio et al. |
| 5,868,915 A | 2/1999 | Ganzi et al. |
| 5,891,328 A | 4/1999 | Goldstein |
| 5,925,240 A | 7/1999 | Wilkins et al. |
| 5,925,255 A | 7/1999 | Mukhopadhyay |
| 5,928,807 A | 7/1999 | Elias |
| 5,944,999 A | 8/1999 | Chancellor et al. |
| 5,954,935 A | 9/1999 | Neumeister et al. |
| 5,961,805 A | 10/1999 | Terada et al. |
| 5,980,716 A | 11/1999 | Horinouchi et al. |
| 6,030,535 A | 2/2000 | Hayashi et al. |
| 6,056,878 A | 5/2000 | Tessier et al. |
| 6,099,716 A | 8/2000 | Molter et al. |
| 6,103,125 A | 8/2000 | Kuepper |
| 6,113,797 A | 9/2000 | Al-Samadi |
| 6,123,823 A | 9/2000 | Mani |
| 6,126,805 A | 10/2000 | Batchelder et al. |
| 6,126,834 A | 10/2000 | Tonelli et al. |
| RE36,972 E | 11/2000 | Baker et al. |
| 6,146,524 A | 11/2000 | Story |
| 6,149,788 A | 11/2000 | Tessier et al. |
| 6,171,374 B1 | 1/2001 | Barton et al. |
| 6,183,643 B1 | 2/2001 | Goodley |
| 6,187,154 B1 | 2/2001 | Yamaguchi et al. |
| 6,187,162 B1 | 2/2001 | Mir |
| 6,187,201 B1 | 2/2001 | Abe et al. |
| 6,190,528 B1 | 2/2001 | Li et al. |
| 6,190,553 B1 | 2/2001 | Lee |
| 6,190,558 B1 | 2/2001 | Robbins |
| 6,193,869 B1 | 2/2001 | Towe et al. |
| 6,197,174 B1 | 3/2001 | Barber et al. |
| 6,197,189 B1 | 3/2001 | Schwartz et al. |
| 6,214,204 B1 | 4/2001 | Gadkaree et al. |
| 6,228,240 B1 | 5/2001 | Terada et al. |
| 6,235,166 B1 | 5/2001 | Towe et al. |
| 6,248,226 B1 | 6/2001 | Shinmei et al. |
| 6,254,741 B1 | 7/2001 | Stuart et al. |
| 6,258,278 B1 | 7/2001 | Tonelli et al. |
| 6,267,891 B1 | 7/2001 | Tonelli et al. |
| 6,274,019 B1 | 8/2001 | Kuwata |
| 6,279,019 B1 | 8/2001 | Oh et al. |
| 6,284,124 B1 | 9/2001 | DiMascio et al. |
| 6,284,399 B1 | 9/2001 | Oko et al. |
| 6,296,751 B1 | 10/2001 | Mir |
| 6,303,037 B1 | 10/2001 | Tamura et al. |
| 6,334,955 B1 | 1/2002 | Kawashima et al. |
| 6,344,122 B1 | 2/2002 | Deguchi et al. |
| 6,365,023 B1 | 4/2002 | De Los Reyes et al. |
| 6,375,812 B1 | 4/2002 | Leonida |
| 6,379,518 B1 | 4/2002 | Osawa et al. |
| 6,391,178 B1 | 5/2002 | Garcia et al. |
| 6,402,916 B1 | 6/2002 | Sampson et al. |
| 6,402,917 B1 | 6/2002 | Emery et al. |
| 6,402,920 B1 | 6/2002 | Sato et al. |
| 6,458,257 B1 | 10/2002 | Andrews et al. |
| 6,461,512 B1 | 10/2002 | Hirayama et al. |
| 6,462,935 B1 | 10/2002 | Shiue et al. |
| 6,468,430 B1 | 10/2002 | Kimura et al. |
| 6,471,853 B1 | 10/2002 | Moscaritolo |
| 6,471,867 B2 | 10/2002 | Sugaya et al. |
| 6,482,304 B1 | 11/2002 | Emery et al. |
| 6,485,649 B1 | 11/2002 | Terava et al. |
| 6,495,014 B1 | 12/2002 | Datta et al. |
| 6,508,936 B1 | 1/2003 | Hassan |
| 6,537,436 B2 | 3/2003 | Schmidt et al. |
| 6,537,456 B2 | 3/2003 | Mukhopadhyay |
| 6,607,647 B2 | 8/2003 | Wilkins et al. |
| 6,607,668 B2 | 8/2003 | Rela |
| 6,627,073 B2 | 9/2003 | Hirota et al. |
| 6,645,383 B1 | 11/2003 | Lee et al. |
| 6,648,307 B2 | 11/2003 | Nelson et al. |
| 6,649,037 B2 * | 11/2003 | Liang et al. ............... 204/632 |
| 6,651,383 B2 | 11/2003 | Grott |
| 6,726,822 B2 | 4/2004 | Garcia et al. |
| 6,730,227 B2 | 5/2004 | Zeiher et al. |
| 6,766,812 B1 | 7/2004 | Gadini |
| 6,773,588 B2 | 8/2004 | Beeman et al. |
| 6,780,328 B1 | 8/2004 | Zhang |
| 6,783,666 B2 | 8/2004 | Takeda et al. |
| 6,795,298 B2 | 9/2004 | Shiue et al. |
| 6,808,608 B2 | 10/2004 | Srinivasan et al. |
| 6,824,662 B2 | 11/2004 | Liang et al. |
| 6,838,001 B2 | 1/2005 | Zeiher et al. |
| 6,896,814 B2 | 5/2005 | Chidambaran et al. |
| 6,998,053 B2 | 2/2006 | Awerbuch |
| 7,083,730 B2 | 8/2006 | Davis |
| 7,122,149 B2 | 10/2006 | Li et al. |
| 7,144,511 B2 | 12/2006 | Vuong |
| 7,147,785 B2 | 12/2006 | Arba et al. |
| 7,264,737 B2 * | 9/2007 | Godec et al. ............... 210/739 |
| 7,306,724 B2 | 12/2007 | Gordon |
| 7,459,088 B2 | 12/2008 | Davis |
| 7,470,366 B2 | 12/2008 | Queen et al. |
| 7,501,064 B2 | 3/2009 | Schmidt et al. |
| 7,563,351 B2 | 7/2009 | Wilkins et al. |
| 7,807,032 B2 * | 10/2010 | Yan et al. ............... 204/520 |
| 2001/0003329 A1 | 6/2001 | Sugaya et al. |
| 2001/0037942 A1 | 11/2001 | Schmidt et al. |
| 2002/0011413 A1 | 1/2002 | DiMascio et al. |
| 2002/0020626 A1 | 2/2002 | Sato |
| 2002/0092769 A1 | 7/2002 | Garcia et al. |
| 2002/0104804 A1 | 8/2002 | Grott |
| 2002/0125137 A1 | 9/2002 | Sato et al. |
| 2002/0144948 A1 | 10/2002 | Aimar et al. |
| 2002/0144954 A1 | 10/2002 | Arba et al. |
| 2002/0189951 A1 | 12/2002 | Liang et al. |
| 2003/0059663 A1 | 3/2003 | Misumi |
| 2003/0079992 A1 | 5/2003 | Wilkins et al. |
| 2003/0079993 A1 | 5/2003 | Miwa et al. |
| 2003/0080467 A1 | 5/2003 | Andrews et al. |
| 2003/0089609 A1 | 5/2003 | Liang et al. |
| 2003/0098266 A1 | 5/2003 | Shiue et al. |
| 2003/0150732 A1 | 8/2003 | Yamanaka et al. |
| 2003/0155243 A1 | 8/2003 | Sferrazza |
| 2003/0188352 P1 | 10/2003 | Byrne et al. |
| 2003/0201235 A1 | 10/2003 | Chidambaran et al. |
| 2003/0205526 A1 | 11/2003 | Vuong |

(56) References Cited

U.S. PATENT DOCUMENTS

| | | |
|---|---|---|
| 2003/0213695 A1 | 11/2003 | Yamanaka et al. |
| 2004/0035802 A1 | 2/2004 | Emery et al. |
| 2004/0055955 A1 | 3/2004 | Davis |
| 2004/0079700 A1 | 4/2004 | Wood et al. |
| 2004/0089551 A1 | 5/2004 | Liang et al. |
| 2004/0173535 A1 | 9/2004 | Li |
| 2004/0178075 A1 | 9/2004 | Sato |
| 2005/0016922 A1 | 1/2005 | Enzweiler et al. |
| 2005/0016932 A1 | 1/2005 | Arba et al. |
| 2005/0040115 A1 | 2/2005 | Reinhard |
| 2005/0098436 A1 | 5/2005 | Miwa et al. |
| 2005/0103622 A1 | 5/2005 | Jha et al. |
| 2005/0103630 A1 | 5/2005 | Ganzi et al. |
| 2005/0103631 A1 | 5/2005 | Freydina et al. |
| 2005/0103644 A1 | 5/2005 | Wilkins et al. |
| 2005/0103717 A1 | 5/2005 | Jha et al. |
| 2005/0103722 A1 | 5/2005 | Freydina et al. |
| 2005/0103723 A1 | 5/2005 | Wilkins et al. |
| 2005/0103724 A1 | 5/2005 | Wilkins et al. |
| 2005/0109703 A1 | 5/2005 | Newenhizen |
| 2005/0121388 A1 | 6/2005 | Wood et al. |
| 2005/0210745 A1 | 9/2005 | Grott |
| 2005/0217995 A1 | 10/2005 | Reinhard |
| 2005/0247631 A1 | 11/2005 | Queen et al. |
| 2005/0263457 A1 | 12/2005 | Wilkins et al. |
| 2006/0027457 A1 | 2/2006 | Sato |
| 2006/0042957 A1 | 3/2006 | He |
| 2006/0060532 A1 | 3/2006 | Davis |
| 2006/0091013 A1 | 5/2006 | Takahashi et al. |
| 2006/0091077 A1 | 5/2006 | Haas et al. |
| 2006/0144787 A1 | 7/2006 | Schmidt et al. |
| 2006/0157422 A1 | 7/2006 | Freydina et al. |
| 2006/0163056 A1 | 7/2006 | Grebenyuk et al. |
| 2006/0169580 A1 | 8/2006 | Grebenyuk et al. |
| 2006/0169581 A1 | 8/2006 | Grebenyuk et al. |
| 2006/0231403 A1* | 10/2006 | Riviello .................. 204/524 |
| 2006/0231404 A1 | 10/2006 | Riviello |
| 2006/0231406 A1 | 10/2006 | Freydina et al. |
| 2006/0231495 A1 | 10/2006 | Freydina et al. |
| 2006/0254919 A1 | 11/2006 | Jangbarwala |
| 2006/0266651 A1 | 11/2006 | Iwasaki |
| 2006/0291839 A1 | 12/2006 | Zoccolante et al. |
| 2007/0045196 A1 | 3/2007 | Kawaguchi et al. |
| 2007/0278099 A1 | 12/2007 | Barber |
| 2007/0284251 A1 | 12/2007 | Zuback et al. |
| 2007/0284252 A1 | 12/2007 | Ganzi et al. |
| 2007/0295604 A1 | 12/2007 | Freydina |
| 2008/0067125 A1 | 3/2008 | Wilkins et al. |
| 2008/0073215 A1 | 3/2008 | Barber et al. |

FOREIGN PATENT DOCUMENTS

| | | |
|---|---|---|
| CN | 1044411 A | 8/1990 |
| DE | 1201055 B | 9/1965 |
| DE | 2708240 A1 | 8/1978 |
| DE | 3238280 A1 | 4/1984 |
| DE | 4003812 A1 | 8/1990 |
| DE | 4016000 A1 | 11/1991 |
| DE | 4238532 A1 | 5/1994 |
| DE | 4418812 A1 | 12/1995 |
| DE | 19942347 A1 | 3/2001 |
| EP | 0170895 A2 | 2/1986 |
| EP | 0417506 A1 | 3/1991 |
| EP | 0462606 A1 | 12/1991 |
| EP | 0503589 A1 | 9/1992 |
| EP | 0621072 A2 | 10/1994 |
| EP | 0680932 A2 | 11/1995 |
| EP | 0797529 A1 | 10/1997 |
| EP | 0803474 A2 | 10/1997 |
| EP | 0870533 A1 | 10/1998 |
| EP | 1068901 A2 | 1/2001 |
| EP | 1075868 A2 | 2/2001 |
| EP | 1101790 A1 | 5/2001 |
| EP | 1106241 A1 | 6/2001 |
| EP | 1129765 A1 | 9/2001 |
| EP | 1222954 A | 12/2001 |
| EP | 1172145 A2 | 1/2002 |
| EP | 1222954 A1 | 7/2002 |
| EP | 1308201 A1 | 5/2003 |
| EP | 1388595 A1 | 2/2004 |
| EP | 1506941 A1 | 2/2005 |
| EP | 1762546 A1 | 3/2007 |
| FR | 2818267 A1 | 6/2002 |
| GB | 776469 A | 6/1957 |
| GB | 876707 A | 9/1961 |
| GB | 877239 A | 9/1961 |
| GB | 880344 A | 10/1961 |
| GB | 893051 A | 4/1962 |
| GB | 942762 A | 11/1963 |
| GB | 1048026 A | 11/1966 |
| GB | 1137679 A | 12/1968 |
| GB | 1318036 A | 5/1973 |
| GB | 1381681 A | 1/1975 |
| GB | 1448533 A | 9/1976 |
| GB | 2278069 A | 11/1994 |
| GB | 2303802 A | 3/1997 |
| GB | 2403166 A | 12/2004 |
| JP | 54-5888 | 1/1979 |
| JP | 02307514 A | 12/1990 |
| JP | 05271015 A | 10/1993 |
| JP | 06-000339 A | 1/1994 |
| JP | 06030535 A | 2/1994 |
| JP | 07-155750 A | 6/1995 |
| JP | 07-265865 A | 10/1995 |
| JP | 09-253643 A | 9/1997 |
| JP | 11-42483 A | 2/1999 |
| JP | 2000126767 A | 5/2000 |
| JP | 2001-79358 | 3/2001 |
| JP | 2001-79553 | 3/2001 |
| JP | 2001-104960 A | 4/2001 |
| JP | 2001-113137 A | 4/2001 |
| JP | 2001-113279 A | 4/2001 |
| JP | 2001-113280 A | 4/2001 |
| JP | 2001-121152 A | 5/2001 |
| JP | 2002001070 A | 1/2002 |
| JP | 2002126744 A | 5/2002 |
| JP | 2003094064 A | 4/2003 |
| JP | 2005007347 A | 1/2005 |
| JP | 2005007348 A | 1/2005 |
| RO | 114874 B1 | 8/1999 |
| RU | 2004137231 A | 6/2006 |
| RU | 2281255 C1 | 8/2006 |
| SU | 216622 | 11/1972 |
| SU | 990256 | 1/1983 |
| SU | 1118389 | 10/1984 |
| WO | 9203202 A2 | 3/1992 |
| WO | 9211089 A1 | 7/1992 |
| WO | 9532052 A1 | 11/1995 |
| WO | 9532791 A1 | 12/1995 |
| WO | 9618550 A1 | 6/1996 |
| WO | 9622162 A1 | 7/1996 |
| WO | 9725147 A1 | 7/1997 |
| WO | 9746491 A1 | 12/1997 |
| WO | 9746492 A1 | 12/1997 |
| WO | 9811987 A1 | 3/1998 |
| WO | 9817590 A1 | 4/1998 |
| WO | 9820972 A1 | 5/1998 |
| WO | 9858727 A1 | 12/1998 |
| WO | 9939810 A1 | 8/1999 |
| WO | 9951529 A1 | 10/1999 |
| WO | 0030749 A1 | 6/2000 |
| WO | 0064325 A2 | 11/2000 |
| WO | 0075082 A1 | 12/2000 |
| WO | 0149397 A1 | 7/2001 |
| WO | 0204357 A1 | 1/2002 |
| WO | 0214224 A1 | 2/2002 |
| WO | 0226629 A2 | 4/2002 |
| WO | WO 02096807 A | 12/2002 |
| WO | 03040042 A1 | 5/2003 |
| WO | 03053859 A1 | 7/2003 |
| WO | 03086590 A1 | 10/2003 |
| WO | 2004013048 A2 | 2/2004 |
| WO | 2004106243 A1 | 12/2004 |

(56) References Cited

FOREIGN PATENT DOCUMENTS

| WO | 2004112943 A1 | 12/2004 |
|---|---|---|
| WO | WO 2004112943 A | 12/2004 |
| WO | 2005044427 A1 | 5/2005 |
| WO | 2005087669 A1 | 9/2005 |
| WO | 2005106100 A1 | 11/2005 |
| WO | 2005113120 A1 | 12/2005 |
| WO | 2006031732 A2 | 3/2006 |
| WO | 2007145785 A1 | 12/2007 |
| WO | 2007145786 A1 | 12/2007 |

OTHER PUBLICATIONS

"Desalting Handbook for Planners", Desalination and Water Purification Research and Development Program, Report No. 72, 3rd Edition, Jul. 2003, pp. 1-233.
"Guidelines for the Safe Use of Wastewater, Excreta and Greywater", World Health Organization, vol. 2, Wastewater Use in agriculture, pp. 1-196, undated.
"Preliminary Research Study for the Construction of a Pilot Cogeneration Desalination Plant in Southern California," Water Treatment Technology Program Report No. 7, U.S. Department of the Interior May 1995.
"Salt Content in Irrigation Water," Lenntech, pp. 1-5, undated.
"SAR Hazard of Irrigation," Lenntech, pp. 1-4, undated.
"Using Desalination Technologies for Water Treatment", Mar. 1988 NTIS Order #PB88-193354.
"Zeta Potential," Lenntech, pp. 1-3, undated.
Almulla et al., "Developments in high recovery brackish water desalination plants as part of the solution to water quantity problems," Desalination 153 (2002) pp. 237-243.
ASTM, "Standard Practice for Calculation and Adjustment of the Langelier Saturation Index for Reverse Osmosis," Designation: D3739-94 (Reapproved 1998), pp. 1-4.
Bhongsuwan et al., "Development of Cellulose Acetate Membranes for Nano- and Reverse-Osmosis Filtration of Contaminants in Drinking Water," Jurnal Teknologi, 41(F) Keluaran Khas. Dis. 2004, pp. 89-100.
Busch et al., "Reducing energy consumption in seawater desalination," Desalination 165 (2004) 299-312.
Calay, J.-C. et al., "The Use of EDI to Reduce the Ammonia Concentration in Steam Generators Blowdown of PWR Nuclear Power Plants," PowerPlant Chemistry, vol. 2, No. 8, 2000, pp. 467-470.
Chemical Processing, Family of High Temperature RO Membrane Elements, Product News, p. 1. Aug. 15, 2002.
Chilean Examination Report from corresponding Chilean Patent Application No. 01707-2007, dated Jun. 7, 2011.
Côte et al, "Use of Ultrafiltration for Water Reuse and Desalination," The ZEEWEED® Ultrafiltration Membrane.
Côte, et al, "A new immersed membrane for pretreatment to reverse osmosis," Desalination 139 (2001) 229-236.
Del Pino et al., "Wastewater reuse through dual-membrane processes: opportunities for sustainable water resources," Desalination (1999) vol. 124, pp. 271-277.
Desalination Post-Treatment: Boron Removal Process, Lenntech.com (1998-2008), 4 pages.
Dimascio et al., "Continuous Electrodeionization: Production of High-Purity Water without Regeneration Chemicals," The Electrochemical Society Interface, Fall 1998, pp. 26-29.
Dimascio et al., "Electrodiaresis Polishing (An Electrochemical Deionization Process)," date unknown, pp. 164-172.
DOW Chemical, "DOWEX Marathon a Ion Exchange Resin," published Dec. 1999, Product Literature reprinted from www.dow.com.
DOW Chemical, "DOWEX Marathon A2 Ion Exchange Resin," published Nov. 1998, Product Literature reprinted from www.dow.com.
Dupont Nafion PFSA Products, Technical Information, "Safe Handling and Use of Perfluorosulfonic Acid Products," Feb. 2004. 4 pages.
Examination Report from corresponding International Application No. GCC/P/2007/8496 dated Apr. 11, 2011.

Farmer et al., Capacitive Deionization of NH4ClO4 Solutions with Carbon Aerogel Electrodes, J. Appl. Electro-Chemistry, vol. 26, (1996), pp. 1007-1018.
FDA, "Guide to Inspections of High Purity Water Systems," printed from www.fda.gov. on Mar. 30, 2004, date unknown.
Frost & Sullivan, "Microfiltration and Ultrafiltration Hold Huge Potential for the Desalination Pretreatment Market," published Nov. 14, 2006, Water Online.
Ganzi, G.C. et al., "Electrodeionization: Theory and Practice of Continuous Electrodeionization," Ultrapure Water, Jul./Aug. 1997, pp. 64-69.
Gifford et al., "An Innovative Approach to Continuous Electrodeionization Module and System Design for Power Applications," Official Proceedings of the 61st Annual Meeting IWC 2000, Oct. 22-26, 2000, Pittsburgh, PA, Paper No. 0052, pp. 479-485.
Gittens, G.J. et al., "The Application of Electrodialysis to Demineralisation," A.I.Ch.E.-I.Chem.E. Symposium Series No. 9, 1965 (London: Instn chem. Engrs), pp. 79-83.
Glueckauf, "Electro-Deionisation Through a Packed Bed," British Chemical Engineering, Dec. 1959, pp. 646-651.
Hell et al., "Experience with full-scale electrodialysis for nitrate and hardness removal," Desalination, (1998) vol. 117, pp. 173-180.
Hobro et al., "Recycling of Chromium from Metal Finishing Waste Waters Using Electrochemical Ion Exchange (EIX)," 1994, pp. 173-183, publication and date unknown.
Hyung et al., "A mechanistic study on boron rejection by sea water reverse osmosis membranes," Journal of Membrane Science (2006) vol. 286, pp. 269-278.
Jha, Anil D. et al., "CEDI: Selecting the Appropriate Configuration," reprinted from Power Engineering, Aug. 2000 edition.
Johnson et al., "Desalting by Means of Porous Carbon Electrodes," Electrochemical Technology, vol. 118, No. 3, Mar. 1971, pp. 510-517.
Judson King, C., et al., "Separation Technology in Japan"; Japanese Technology Evaluation Center; International Tech. Research Institute, Loyola College in Maryland, pp. 1-143, Mar. 1993.
Kedem et al., "EDS—Sealed Cell Electrodialysis," Desalination, vol. 46, 1983, pp. 291-299.
Kedem et al., "Reduction of Polarization by Ion-Conduction Spacers: Theoretical Evaluation of a Model System," Desalination, vol. 27, 1978, pp. 143-156.
Korngold, "Electrodialysis Process Using Ion Exchange Resins Between Membranes," Desalination, vol. 16, 1975, pp. 225-233.
Laktionov, Evgueni Viktorovitch, "Déminéralisation De Solutions Électrolytiques Diluées. Analyse Comparative Des Performances De Differents Procédés D'Électrodialyse", Directeur de these, Université Montpellier II, Science Et Technique Du Languedoc, Jul. 17, 1998.
Larchet et al., "Application of electromembrane technology for providing drinking water for the population of the Aral region," Desalination (2002), vol. 149, pp. 383-387.
Matejka, "Continuous Production of High-Purity Water by Electro-Deionisation," J. Appl. Chem., Biotechnol., vol. 21, Apr. 1971, pp. 117-120.
Mohammad et al., "Predicting flux and rejection of multicomponent salts mixture in nanofiltration membranes," Desalination 157 (2003) 105-111.
Nesicolaci, M., "Reverse Osmosis is Taking Global Water & Wastewater Treatment by Storm," Water Purification Solutions, Severn Trent Services, undated.
Oren, Yoran et al., "Studies on Polarity Reversal with Continuous Deionization," Desalination, Elsevier Scientific Publishing Co., Amsterdam, NL, vol. 86, No. 2, Jun. 1, 1992, pp. 155-171.
Osmonics® Hot-Water Sanitizable RO Systems, Specifications, pp. 1-2. Copyright 2000 Osonics, Inc. www.osmonics.com <http://www.osmonics.com>.
Peterson, R.J. et al., Temperature-Resistant Elements for Reverse Osmosis Treatment of Hot Process Waters, Published Dec. 1983, Filmtec Corporation, Minneapolis, Minnesota 55435. Prepared for the U.S. Departmen of Energy, Under DOE Contract No. DE-FC07-82ID12423 (DOE/ID/12423-TI—DE84005190), pp. 1-69.

(56) References Cited

OTHER PUBLICATIONS

Pourcelly, Gerald, Conductivity and selectivity of ion exchange membranes: structure-correlations, Desalination, vol. 147 (2002) pp. 359-361.

'Selective boron extraction by polymer supported 2-hydroxylethylamino propylene glycol functions' Mustafa Gazi, Niyazi Bicak, Reactive & Functional Polymers 67 (2007) 936-942. Published by Elsevier Ltd. XP022267641.; Others; 2007.

'Removal and recovery of boron from geothermal wastewater by selective on exchange resins', N. Kabay et al. Reactive & Functional Polymers 60 (2004) 163-170. Elsevier B.V. XP004518374; Others; 2004.

'A selective anion exchange resin that can remove and retain boron for the production of ultrapure water', Rick Mulligan and Daryl Gisch, IP.com Prior Art Database, IP.com No. IPCOM000141636D, IP.com Electronic Publication: Oct. 11, 2006.; Others; 2006.

Public Health and the Environment World Health Organization, "Desalination for Safe Water Supply, Guidance for the Health and Environmental Aspects Applicable to Desalination," Geneva 2007.

Purolite Technical Bulletin, Hypersol-Macronet™ Sorbent Resins, 1995.

R. Simons, "Strong Electric Field Effects on Proton Transfer Between Membrane-Bound Amines and Water," Nature, vol. 280, Aug. 30, 1979, pp. 824-826.

Reverse Osmosis Membrane Elements—131 Duratherm®, pp. 1-2, www.osmonics.com <http://www.osmonics.com> Aug. 2002.

Simons, R., "Electric Field Effects on Proton Transfer Between Ionizable Groups and Water in Ion Exchange Membranes," Electrochimica Acta, vol. 29, No. 2, 1984, pp. 151-158.

Simons, R., "The Origin and Elimination of Water Splitting in Ion Exchange Membranes During Water Demineralisation by Electrodialysis," Desalination, vol. 28, Jan. 29, 1979, pp. 41-42.

Simons, R., "Water Splitting in Ion Exchange Membranes," Pergamon Press Ltd., 1985, pp. 275-282.

Sirivedhin, "Reclaiming produced water for beneficial use: salt removal by electrodialysis," Journal of Membrane Science (2004), vol. 243, pp. 335-343.

Su et al., "Rejection of ions by NF membranes for binary electrolyte solutions of NaCl, NaNO3, CaCl2 and Ca(NO3)2," Desalination (2006) vol. 191, pp. 303-308.

Thanuttamavong et al., "Rejection characteristics of organic and inorganic pollutants by ultra low-pressure nanofiltration of surface water for drinking water treatment," Desalination (2002) vol. 145, pp. 257-264.

Tseng, Tai, et al., "Optimization of Dual-Staged Nanofiltration Membranes for Seawater Desalination"; American Water Works Association 2003 CA-NC Annual Fall Conference; Oct. 7, 2003.

U.S. Bureau of Reclamation, Sandia National Laboratories, "Desalination and Water Purification Technology Roadmap—A Report of the Executive Committee," Jan. 2003.

U.S. Congress, Office of the Technology Assessment, "Using Desalination Technologies for Water Treatment," OTA-BP-O-46 (Washington, D.C.: U.S. Government Printing Office), Mar. 1988.

U.S.P. Requirements for Water for Injection, pp. 1752-1753, 1927-1929. Aug. 2002.

USFilter, "CDI-LX™ Systems," product information, 2001, 6 pages, Mar. 2001.

USFilter, "H-Series Industrial CDI® Systems," product information, 1998, 4 pgs.

V. Shaposhnik et al., "Demineralization of water by electrodialysis with ion-exchange membranes, grains and nets," Desalination, vol. 133, (2001), pp. 211-214.

Veolia Water Implement Hybrid Desalination Solution in New Contract With Fujairah, 1 page, Water Online, Aug. 29, 2007.

Von Gottberg et al., "Optimizing Water Recovery and Energy Consumption for Seawater RO Systems," Water & Process Technologies, General Electric Technical Paper (2005).

Walters et al., "Concentration of Radioactive Aqueous Wastes," Industrial and Engineering Chemistry, Jan. 1955, pp. 61-67.

Wang et al., "A Study of the electrodeionization process-high-purity water production with a RO/EDI system," Desalination, vol. 132, pp. 349-352, Oct. 3, 2000.

Warshawsky et al., "Thermally Regenerable Polymerable Polymeric Crown Ethers, II Synthesis and Application in Electrodialysis," pp. 579-584, publication and date unknown.

Watson, "The Basics of Seawater Desalting by Reverse Osmosis," Water & Wastes Digest, pp. 16-19, Jan. 2007.

Weitnauer, Angela et al., Reverse Osmosis for WFI and PW, Published in: Ultrapure Water, Date: Mar. 1, 1996. pp. 1-6. www.osmonics.com <http://www.osmonics.com>.

Wise et al, "Hot Water Sanitization & RO: A Plain and Simple Introduction", Presented at: Water Conditioning & Purification Magazine; Date Presented: Feb. 1, 2002. Osmonics®, pp. 1-6. www.osmonics.com <http://www.osmonics.com>.

Wise, Brian, Chemical Processing, Turning Up the Heat, Hot Water Sanitation Membranes Tackle Microbes in RO Permeate Water, pp. 1-6. Aug. 2002.

Wood et al., The Use of Hot Water for Sanitization of RO Membranes in Ultrapure Water Systems, U.S. Filter/Ionpure, Inc., Lowell, MA, USA. Oct. 25, 1995. Presented at the 1997 Fifteenth Annual Membrane Technology/Separations Planning Conference, sponsored by Business Communications Co., Inc., Newton, MA, Oct. 29, 1997, pp. 1-10.

Wood, Hot Water Sanitization of Continuous Electrodeionization Systems, Pharmaceutical Engineering, vol. 20, No. 6, Nov./Dec. 2000, pp. 1-15.

Wood, J.H. et al., "Continuous Electrodeionisation: Module Design Considerations for the Production of High Purity Water," Proc. of IEX at the Millenium, Jul. 16, 2000, pp. 44-51.

World Bank, "Seawater and Brackish Water Desalination in the Middle East, North Africa and Central Asia," A Review of Key Issues and Experience in Six Countries Final Report, Main Report, Dec. 2004.

World Health Organization, Guidelines for Drinking-Water Quality; Chemical Facts Sheet pp. 296-461 (2003).

www.wateronline.com/content/news/article.asp <http://www.wateronline.com/content/news/article.asp> Microfiltration and Ultrafiltration Hold Huge Potential for the Desalination Pretreatment Market, Nov. 14, 2006.

Ganzi, "Electrodeionization for High Purity Water Production," AIChE Symposium Series, Membrane Materials and Processes, pp. 73-83, 1988.

\* cited by examiner

US 8,585,882 B2

SYSTEMS AND METHODS FOR WATER TREATMENT

BACKGROUND OF THE INVENTION

1. Field of Invention

This invention relates to systems and methods for water treatment and, in particular, to electrochemical systems and methods which are effective in removing one or more target species from a seawater stream.

2. Discussion of Related Art

Systems capable of treating water with an applied electrical field to remove undesirable ionic species therein are known. These electrochemical devices include, but not limited to, electrodialysis and electrodeionization devices that are conventionally used to generate purified water, such as deionized water.

Within these devices are concentrating and diluting compartments separated by ion-selective membranes. An electrodeionization device conventionally includes alternating electroactive semipermeable anion and cation exchange membranes. Spaces between the membranes are configured to create liquid flow compartments with inlets and outlets. The compartments typically contain adsorption media, such as ion exchange resin, to facilitate ion transfer. An applied electric field imposed via electrodes causes dissolved ions, attracted to their respective counter-electrodes, to migrate through the anion and cation exchange membranes. This generally results in the liquid of the diluting compartment being depleted of ions, and the liquid in the concentrating compartment being enriched with the transferred ions. Typically, the liquid in the diluting compartment is desired (the "product" liquid), while the liquid in the concentrating compartment is discarded (the "reject" liquid).

SUMMARY OF THE INVENTION

Aspects of the invention relate generally to electrochemical devices and systems and methods for water treatment.

In accordance with one or more aspects, a method of treating seawater is disclosed. The method may comprise introducing seawater comprising chloride ions and boron-containing compounds to at least a first compartment of an electrically driven separation device, the first compartment comprising a resin bed and an outlet, promoting transport of the chloride ions in the seawater from the first compartment to a second compartment of the electrically driven separation device, promoting ionization of at least a portion of the boron-containing compounds in the seawater in the first compartment, adsorbing at least a portion of the ionized boron-containing compounds on the resin bed in the first compartment, and recovering treated water at the outlet of the first compartment.

The method may further comprise releasing at least a portion of boron-containing compounds bound in a second resin bed in the second compartment. In some aspects, the method may further comprise recovering a boron-containing stream at an outlet of the second compartment. A pH level of the treated water may also be adjusted. The method may further comprise reversing polarity of an electric current applied through the electrically driven separation device. A concentration of boron in the treated water may be monitored. The polarity of an electric current applied through the electrically driven separation device may be reversed in response to detecting a concentration of boron in the treated water that is above a predetermined level. In some aspects, the predetermined level is about 1 ppm. Treated water may be directed to a third compartment of the electrically driven separation device. In some aspects, a pH level of the treated water may be monitored and the polarity of an electric current applied through the electrically driven separation device reversed in response to detecting a pH level of the treated water that is above a predetermined level.

In accordance with one or more aspects, a method of operating an electrodeionization device is disclosed. The method may comprise introducing process water comprising boron-containing compounds to a first compartment of the electrodeionization device, the first compartment comprising a resin bed and an outlet, promoting a basic pH condition in the first compartment, promoting an acidic pH condition in a second compartment of the electrodeionization device adjacent the first compartment, adsorbing borate ions on the resin bed in the first compartment, recovering treated water at the outlet of the first compartment, and recovering a boron-containing stream at an outlet of the second compartment.

The method may further comprise monitoring a concentration of boron in the treated water. Polarity of an electric current applied through the electrodeionization device may be reversed in response to a detected boron concentration. In some aspects, a pH level of the treated water may be adjusted. Recovering a boron-containing stream may comprise releasing boron-containing compounds from a resin in the second compartment.

In accordance with one or more aspects, a water treatment system comprising an electrically driven separation device comprising a first compartment containing a boron-selective resin bed is disclosed.

The boron-selective resin bed may comprise cis-diol functional groups. In some aspects, the electrically driven separation device is constructed and arranged to reduce a concentration of boron in seawater to a level of about 0.5 to 1 ppm. The first compartment of the electrically driven separation device may be at least partially defined by a first anion-selective membrane and a first cation-selective membrane. The electrically driven separation device may further comprise a second compartment at least partially defined by the first anion-selective membrane and a second cation-selective membrane. In some aspects, the system may further comprise a sensor positioned in fluid communication downstream of the boron-selective resin bed and be configured to provide a measurement signal representative of a concentration of boron in the treated water from the electrically driven separation device. The system may still further comprise a controller in communication with the sensor and be configured to produce a control signal to a power supply associated with the electrically driven separation device based at least partially on the measurement signal. In some aspects, a composition of the boron-selective resin bed in the first compartment may be substantially uniform along a fluid flow path through the first compartment of the electrically driven separation device.

In accordance with one or more aspects, a method of treating seawater having dissolved species and at least one target species is disclosed. The method may comprise introducing a first portion of seawater from a seawater source into a depleting compartment of an electrically-driven separation device, the depleting compartment having target species-adsorbing media disposed between an anion permeable membrane and a first cation permeable membrane, introducing a second portion of seawater from the seawater source into a concentrating compartment of the electrically-driven separation device, the concentrating compartment having target species-adsorbing media disposed between the anion permeable membrane and a second cation permeable membrane, and promoting transport of at least a portion of the dissolved species into the concentrating compartment while converting at least a portion of the at least one target species into a preferred ionic state.

In some aspects, the method may further comprise adjusting the pH of at least a portion of water from the depleting compartment in a neutralizing compartment of the electrically-driven separation device, the neutralizing compartment at least partially defined by the second cation permeable membrane and a third cation permeable membrane. Promoting transport of at least a portion of the dissolved species into the concentrating compartment may comprise applying an electric current through the depleting and concentrating compartments. Applying the electric current may promote polarization of water in at least one compartment of the electrically-driven separation device to produce hydronium ions, and adjusting the pH of the at least a portion of water from the depleting compartment may comprise promoting transport of at least a portion of the hydronium ions into the neutralizing compartment. In some aspects, applying the electric current comprises passing electric current sufficient to raise a pH of the seawater in the depleting compartment to at least 9.2 units. The neutralizing compartment may be free of electroactive media.

In some aspects, an electrically driven separation device is disclosed. The device may comprise a first compartment at least partially defined by a first cation selective membrane and a first anion selective membrane, a second compartment at least partially defined by the first anion selective membrane and a second cation selective membrane, and boron-selective electroactive media located in at least one of the first and second compartments.

In other aspects, the device may further comprise a third compartment at least partially defined by the second cation selective membrane. The third compartment may be at least partially defined by a bipolar membrane. An outlet of the first compartment may be fluidly connected to an inlet of the third compartment. An outlet of the electrically driven separation device may be fluidly connected to a potable point of use. In some aspects, the electroactive media may comprise cis-diol functional groups. The third compartment may be substantially free of electroactive media. In at least one aspect, no reverse osmosis membrane is fluidly connected downstream of the electrically driven separation device. In at least another aspect, no resin bed is fluidly connected downstream of the electrically driven separation device.

In still other aspects, the device may further comprise a sensor positioned in fluid communication downstream of the resin bed and configured to provide a measurement signal representative of a concentration of boron in the treated water from the electrically driven separation device. The measurement signal may comprise a detected pH level. The device may further comprise a controller in communication with the sensor and be configured to produce a control signal to a power supply associated with the electrically driven separation device based at least partially on the measurement signal. In some aspects, the electroactive media comprises N-methyl glucamine functional groups.

Still other aspects, embodiments, and advantages of these exemplary aspects and embodiments, are discussed in detail below. Moreover, it is to be understood that both the foregoing information and the following detailed description are merely illustrative examples of various aspects and embodiments, and are intended to provide an overview or framework for understanding the nature and character of the claimed aspects and embodiments. The accompanying drawings are included to provide illustration and a further understanding of the various aspects and embodiments, and are incorporated in and constitute a part of this specification. The drawings, together with the remainder of the specification, serve to explain principles and operations of the described and claimed aspects and embodiments.

BRIEF DESCRIPTION OF THE DRAWINGS

Various aspects of at least one embodiment are discussed below with reference to the accompanying figures. In the figures, which are not intended to be drawn to scale, each identical or nearly identical component that is illustrated in various figures is represented by a like numeral. For purposes of clarity, not every component may be labeled in every drawing. The figures are provided for the purposes of illustration and explanation and are not intended as a definition of the limits of the invention. In the figures.

DETAILED DESCRIPTION

Figure 1:
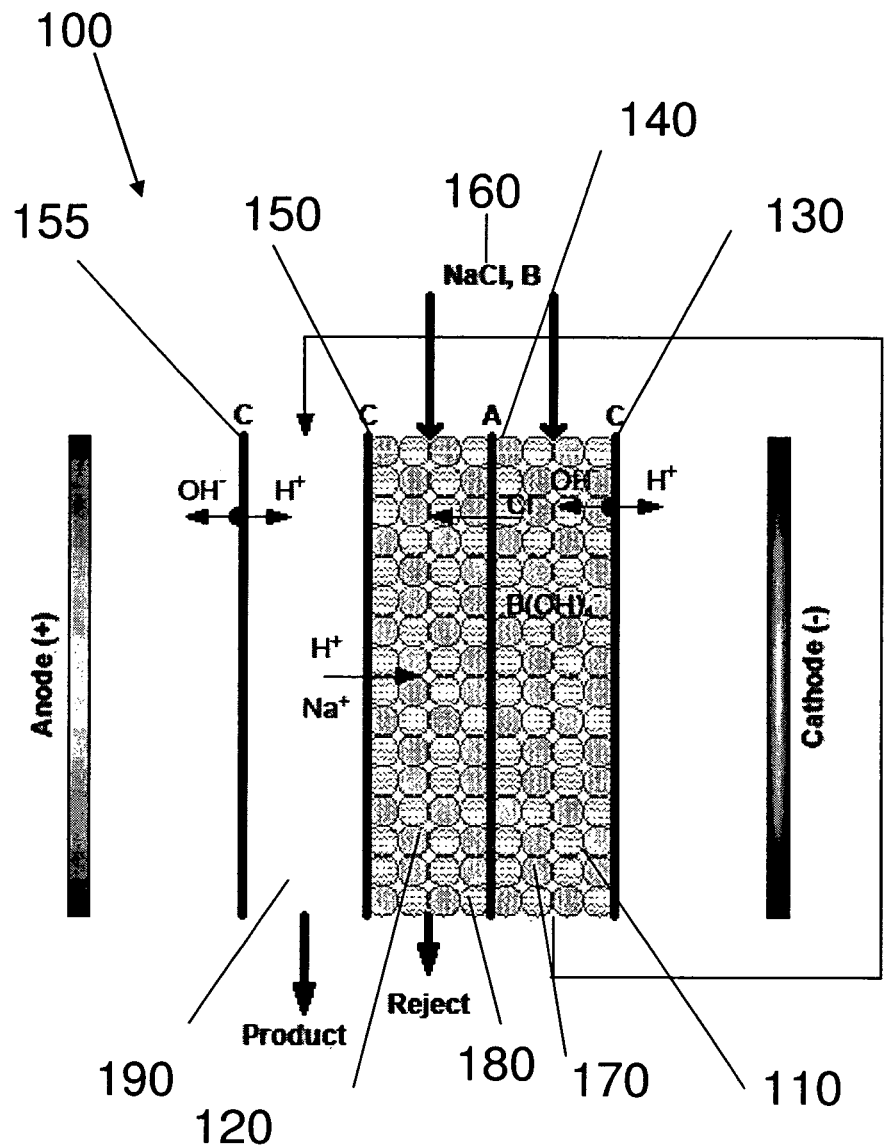
FIG. 1 schematically illustrates a device in accordance with one or more embodiments.

One or more embodiments relate to electrochemical devices including electrically-driven separation devices and methods for water treatment. The devices and methods may be generally effective in removing one or more target species from a water stream. In one non-limiting embodiment, devices and methods may efficiently remove boron from water. The devices and methods may also be used for desalination in at least one embodiment. As described in greater detail herein, one or more embodiments may generally involve acid and/or base generation to promote cyclic loading and regeneration of adsorption media for water treatment. This new approach to electrochemical treatment may be more effective in removing certain target species than traditional electrochemical techniques which rely upon transmembrane ionic transport for electrochemical separation. Beneficially, one or more embodiments may provide a product stream of sufficient quality to be delivered to downstream points of use, such as potable, irrigation and industrial applications, for example, semiconductor fabrication. The pH level of a product stream may also be neutralized or adjusted in-situ in accordance with one or more embodiments.

It is to be appreciated that embodiments of the systems and methods discussed herein are not limited in application to the details of construction and the arrangement of components set forth in the following description or illustrated in the accompanying drawings. The systems and methods are capable of implementation in other embodiments and of being practiced or of being carried out in various ways. Examples of specific implementations are provided herein for illustrative purposes only and are not intended to be limiting. In particular, acts, elements and features discussed in connection with any one or more embodiments are not intended to be excluded from a similar role in any other embodiments. Also, the phraseology and terminology used herein is for the purpose of description and should not be regarded as limiting.

In accordance with one or more embodiments, devices and methods may generally involve electrical separation techniques for water treatment. An electrochemical device, such as an electrodeionization device, is generally able to separate one or more components of a liquid, for example, ions dissolved and/or suspended therein, by using an electrical field to influence and/or induce transport or otherwise provide mobility of the dissolved and/or suspended species in the liquid thereby at least partially effecting separation, or removal, of the species from the liquid. The one or more species in the liquid can be considered, with respect to certain aspects, a "target" species.

In accordance with one or more embodiments, and as discussed in greater detail herein, a process stream may be introduced to at least one compartment of an electrochemical device for treatment. The process stream may contain one or more target species or target ions. Some target species may be a precursor to an acid or base generated within the electrochemical device. Thus, the process stream may be a source of an acid or base precursor. The precursor may comprise one or more ions, generally present in the process stream. In at least some embodiments, the ions may be dissociated in the process stream. It may be desirable to remove one or more target species from the process stream. In accordance with one or more embodiments, an ionic state of a target species may be manipulated to promote removal thereof by the electrochemical device. For example, a target species may be converted to a preferred ionic state of the species to facilitate removal thereof.

In accordance with one or more embodiments, the process stream may generally comprise a water stream deliverable to the electrochemical device for treatment. In some embodiments, the process stream may generally comprise a salt solution. A salt solution may contain a single salt species or a mixture of salt species, for example, as may be present in seawater. In at least one embodiment, the process stream may comprise non-potable water. Potable water typically has a total dissolved solids (TDS) content of less than about 1,000 ppm. In some cases, potable water may have a TDS content of less than about 500 ppm. Examples of non-potable water may include seawater or salt water, brackish water, gray water, and some industrial water. A process stream may include target species such as chloride, sulfate, bromide, silicate, iodide, phosphate, sodium, magnesium, calcium, potassium, nitrate, arsenic, lithium, boron, strontium, molybdenum, manganese, aluminum, cadmium, chromium, cobalt, copper, iron, lead, nickel, selenium, silver and zinc. In accordance with one or more embodiments, the invention is directed to a method of treating seawater or brackish water where the source water comprises a solute mixture. In some embodiments, monovalent ions may be at a higher concentration as compared to the concentrations of divalent and other multivalent ions. References to seawater herein are generally applicable to other forms of non-potable water.

In some applications, it may be important or desirable to reduce the concentration of boron species in water to a level that is considered to be suitable for agricultural service and/or human consumption. For example, the desired concentration of boron species can desirably be less than about 1 ppm. In some cases, the concentration of boron species is desirably about or even less than the level as suggested by government and/or health organizations. For example, the concentration of boron can be at about or less than the level suggested by the World Health Organization, at about 0.5 ppm. Indeed, in some applications, the concentration of boron in the treated water is preferably less than about 0.4 ppm. Because seawater often contains high levels of boron, for example, about 1 to about 4 ppm, this target, recommended or suggested boron level can be difficult to achieve utilizing conventional desalination processes. Advantageously, the systems and techniques of the invention can be utilized to reduce boron species concentration in a feed water to an acceptable level. Indeed, some embodiments of the invention are directed to systems and techniques that reduce the boron concentration in a feed stream from about 4.6 ppm to less than about 0.5 ppm.

Some aspects of the invention relate to methods and apparatus for purifying seawater, and other non-potable water, which utilize, inter alia, electrodesalting or other electrochemical systems. The electrochemical device may involve electrodeionization ("EDI") as discussed further herein. Electrochemical techniques can also include processes such as continuous deionization, filled cell electrodialysis, electrodiaresis, and current reversing electrodialysis. The techniques may be combined with pressure driven membrane systems and/or other water treatment systems. As used herein, "purify" relates to reducing the total dissolved solids content and optionally to reducing the concentration of suspended solids, colloidal content and ionized and non-ionized impurities in a source water to a level where the purified water has been rendered potable and can be used for fresh water purposes such as, but not limited to, human and animal consumption, irrigation, and industrial applications. Desalination is a type of purification in which salt is removed from seawater. The invention, in some aspects, pertains to desalination of seawater. The feed water or water to be treated may be from a variety of sources including those having a TDS content of between about 3,000 ppm and about 40,000 ppm, or more. Feed water can be, for example, seawater from the ocean, brackish water, gray water, industrial effluent, and oil fill recovery water. The feed water may contain high levels of monovalent salts, divalent and multivalent salts, and organic species. Notable aspects of the invention involve methods of treating or desalinating a process water or a feed water consisting of or consisting essentially of seawater.

Prior to treatment of feed water in the electrochemical device, a variety of pretreatment procedures can be employed. For example, pretreatment techniques may be utilized on a feed water that may contain solids or other materials that may interfere with or reduce the efficiency of any stage or device, such as by scaling or fouling. An optional initial treatment may be provided to remove at least a portion of suspended solids, colloidal substances and/or solutes of elevated molecular weight. Pretreatment processes may be performed upstream of the EDI device and may include, for example, particulate filtration, sand filtration, carbon filtration, ultrafiltration, nanofiltration, microfiltration, such as cross-flow microfiltration, combinations thereof and other separation methods directed to the reduction of particulates. Adjustments to the pH and/or alkalinity of feed water may also be performed by, for example, the addition of an acid, base or buffer, or through aeration. Electrochemical separation may follow any pretreatment operation to provide water having a desired final purity.

In accordance with one or more embodiments, a water treatment system may include one or more electrochemical devices. Non-limiting examples of electrical separation devices, or electrically-driven separation apparatus, include electrodialysis and electrodeionization devices. The term "electrodeionization" is given its ordinary definition as used in the art. Typically within these exemplary devices are concentrating and diluting compartments separated by media having selective permeability, such as anion-selective and cation-selective membranes. In these devices, an applied electric field causes ionizable species, dissolved ions, to migrate through the selectively permeable media, i.e., anion-selective and cation-selective membranes, resulting in the liquid in the diluting compartment being depleted of ions, and the liquid in the concentrating compartment being enriched with the migrant, transferred ions. In some embodiments, the electrochemical device may comprise one or more electrodeionization units. In at least one embodiment, the electrochemical device may consist essentially of one or more electrodeionization units.

Electrodeionization is a process that removes, or at least reduces, one or more ionized or ionizable species from water using electrically active media and an electric potential to influence ion transport. The electrically active media typically serves to alternately collect and discharge ionic and/or ionizable species and, in some cases, to facilitate the transport of ions, which may be continuously, by ionic or electronic substitution mechanisms. EDI devices can comprise electrochemically active media of permanent or temporary charge, and may be operated batch-wise, intermittently, continuously, and/or even in reversing polarity modes. EDI devices may be operated to promote one or more electrochemical reactions specifically designed to achieve or enhance performance. Further, such electrochemical devices may comprise electrically active membranes, such as semi-permeable or selectively permeable ion exchange or bipolar membranes. Continuous electrodeionization (CEDI) devices are EDI devices known to those skilled in the art that operate in a manner in which water purification can proceed continuously, while ion exchange material is continuously recharged. See, for example, U.S. Pat. Nos. 6,824,662; 6,514,398; 6,312,577; 6,284,124; 5,736,023; 5,558,753 and 5,308,466, each of which is incorporated by reference herein in its entirety for all purposes. CEDI techniques can include processes such as continuous deionization, filled cell electrodialysis, or electrodiaresis. Under controlled voltage and salinity conditions, in CEDI systems, water molecules can be split to generate hydrogen or hydronium ions or species and hydroxide or hydroxyl ions or species that can regenerate ion exchange media in the device and thus facilitate the release of the trapped species therefrom. In this manner, a water stream to be treated can be continuously purified without requiring chemical recharging of ion exchange resin.

Electrodialysis (ED) devices operate on a similar principle as CEDI, except that ED devices do not contain electroactive media between the membranes. Because of the lack of elecroactive media, the operation of ED may be hindered on feed waters of low salinity because of elevated electrical resistance. Also, because the operation of ED on high salinity feed waters can result in elevated electrical current consumption, ED apparatus have heretofor been most effectively used on source waters of at least intermediate salinity. In ED based systems, because there is no electroactive media, splitting water is inefficient and operating in such a regime is generally avoided.

In CEDI and ED devices, a plurality of adjacent cells or compartments are typically separated by selectively permeable membranes that allow the passage of either positively or negatively charged species, but typically not both. Dilution or depletion compartments are typically interspaced with concentrating or concentration compartments in such devices. As water flows through the depletion compartments, ionic and other charged species are typically drawn into concentrating compartments under the influence of an electric field, such as a direct current (DC) field. Positively charged species are drawn toward a cathode, typically located at one end of a stack of multiple depletion and concentration compartments, and negatively charged species are likewise drawn toward an anode of such devices, typically located at the opposite end of the stack of compartments. The electrodes are typically housed in electrolyte compartments that are usually partially isolated from fluid communication with the depletion and/or concentration compartments. Once in a concentration compartment, charged species are typically trapped by a barrier of selectively permeable membrane at least partially defining the concentration compartment. For example, anions are typically prevented from migrating further toward the cathode, out of the concentration compartment, by a cation selective membrane. Once captured in the concentrating compartment, trapped charged species can be removed in a concentrate stream.

In CEDI and ED devices, the DC field is typically applied to the cells from a source of voltage and electric current applied to the electrodes (anode or positive electrode, and cathode or negative electrode). The voltage and current source (collectively "power supply") can be itself powered by a variety of means such as an AC power source, or for example, a power source derived from solar, wind, or wave power. At the electrode/liquid interfaces, electrochemical half cell reactions occur that initiate and/or facilitate the transfer of ions through the membranes and compartments. The specific electrochemical reactions that occur at the electrode/interfaces can be controlled to some extent by the concentration of salts in the specialized compartments that house the electrode assemblies. For example, a feed to the anode electrolyte compartments that is high in sodium chloride will tend to generate chlorine gas and hydrogen ion, while such a feed to the cathode electrolyte compartment will tend to generate hydrogen gas and hydroxide ion. Generally, the hydrogen ion generated at the anode compartment will associate with a free anion, such as chloride ion, to preserve charge neutrality and create hydrochloric acid solution, and analogously, the hydroxide ion generated at the cathode compartment will associate with a free cation, such as sodium, to preserve charge neutrality and create sodium hydroxide solution. In accordance with further embodiments of this invention, the reaction products of the electrode compartments, such as generated chlorine gas and sodium hydroxide, can be utilized in the process as needed for disinfection purposes, for membrane cleaning and defouling purposes, and for pH adjustment purposes.

In accordance with one or more embodiments, the electrochemical device may be operated by applying an electric field across the compartments through electrodes. Operating parameters of the device may be varied to provide desirable characteristics. For example, the applied electric field may be varied in response to one or more characteristics or conditions. Thus, the electric field strength may be held constant or altered in response to a characteristic of the apparatus or a process stream thereof. Indeed, the one or more operating parameters may be altered in response to one or more sensor measurements, e.g., pH, resistivity, concentration of an ion or other species. The electric field imposed through electrodes facilitates migration of charged species such as ions from one compartment to another via ion-selective membranes.

In accordance with one or more embodiments, typical configurations of the electrically-driven separation device include at least one electrode pair through which an applied force, such as an electric field, can facilitate transport or migration of the one or more ionic, or ionizable, species. The device can thus comprise at least one anode and at least one cathode. The electrodes may each independently be made out of any material suitable for creating an electric field within the device. In some cases, the electrode material can be chosen such that the electrodes can be used, for example, for extended periods of time without significant corrosion or degradation. Suitable electrode materials and configurations are well known in the art. Electrodes of electrochemical devices may generally include a base or core made of a material such as carbon, platinum, stainless steel or titanium.

The electrodes may be coated with various materials, for example, iridium oxide, ruthenium oxide, platinum group metals, platinum group metal oxides, or combinations or mixtures thereof. The electrodes typically promote the formation of hydronium and hydroxide ions. These ions, along with the ions in the various feeds, are transported by the potential across the electrochemical device. The flow of ions is related to the electrical current applied to the module.

In some embodiments, the electric field may be applied essentially perpendicular to liquid flow within the device. The electric field may be substantially uniformly applied across the compartments, resulting in an essentially uniform, substantially constant electric field across the compartments; or in some cases, the electric field may be non-uniformly applied, resulting in a non-uniform electric field density across the compartments. In some embodiments of the invention, the polarity of the electrodes may be reversed during operation, reversing the direction of the electric field within the device.

An applied electric field may promote dissociation of the water into hydrogen or hydronium ions, as well as hydroxyl ions. The applied electric field may also promote migration of one or more ions within the electrochemical device. The hydrogen, hydroxyl and/or one or more target ions present may migrate. Ionic migration may be across one or more ion-selective membranes of the electrochemical device. Ions may be concentrated or trapped in one or more compartments, for example, based on their charge or nature. For example, an acidic product may become concentrated in one compartment, and a basic product may become concentrated in another compartment. The orientation and nature of various ion-selective membranes within the electrochemical device may influence migration therein as well as what type of products may be formed in the various compartments. Streams of generated products may exit the electrochemical device via outlets associated with the various compartments, for example, a product solution outlet and/or a reject solution outlet.

In accordance with one or more embodiments, an electrochemical device may include one or more compartments, such as a first compartment and a second compartment. In one or more embodiments pertinent to aspects directed to electrochemical separation techniques, electrically-driven separation devices may comprise one or more depleting compartments and one or more concentrating compartments. Compartments or cells may generally differ functionally with respect to the type, and/or composition of the fluid introduced therein. Structural differences, however, may also distinguish the various compartments. In some embodiments, a device may include one or more types of depleting compartments and one or more types of concentrating compartments. The nature of any given compartment, such as whether it is a concentrating or depleting compartment, may be generally informed by the types of membranes which border the compartment, as well as the type of feed(s) supplied to the compartment. The nature of neighboring compartments may influence each other. In some embodiments, a compartment may be an electrolyzing compartment. For example, a depleting compartment may be referred to as an electrolyzing compartment. In some embodiments, a concentrating compartment may also be referred to as an electrolyzing compartment. In some embodiments, water splitting may generally occur in an electrolyzing compartment. An electrolyzing compartment may be a water splitting cell. Other ionic interactions may also occur in an electrolyzing compartment.

Membranes typically form borders between adjacent compartments. In some embodiments, the membranes may be ion-selective, ion permeable or permselective membranes. Such membranes may generally allow ions of a particular type of charge to pass through the membrane while inhibiting or preventing passage of ions with different charge or valence or type of charge. Thus, one or more compartments may be at least partially defined by one or more ion-selective membranes. A plurality of compartments is typically arranged as a stack in the electrochemical device. A depleting compartment is typically defined by a depleting compartment spacer and concentrating compartment is typically defined by a concentrating compartment spacer. An assembled stack is typically bound by end blocks at each end and is typically assembled using tie rods which may be secured with nuts. In certain embodiments, the compartments include cation-selective membranes and anion-selective membranes, which are typically peripherally sealed to the periphery of both sides of the spacers. The cation-selective membranes and anion-selective membranes typically comprise ion exchange powder, a polyethylene powder binder and a glycerin lubricant. In some embodiments, the cation- and anion-selective membranes are heterogeneous membranes. These may be polyolefin-based membranes or other type. They are typically extruded by a thermoplastic process using heat and pressure to create a composite sheet. In some embodiments, homogeneous membranes, such as those commercially available from Tokuyama Soda of Japan may be implemented. The one or more selectively permeable membranes may be any ion-selective membrane, neutral membrane, size-exclusive membrane, or even a membrane that is specifically impermeable to one or more particular ions or classes of ions. In some cases, an alternating series of cation- and anion-selective membranes is used within the electrically-driven apparatus. The ion-selective membranes may be any suitable membrane that can preferentially allow at least one ion to pass therethrough, relative to another ion.

In one embodiment, a plurality of compartments can be bounded, separated or at least partially defined by one or more ion-selective membranes "c" and "a". In some embodiments, ion-selective membranes a and c are arranged as an alternating series of cation-selective membranes (designated as "c") that preferentially allow cations to pass therethrough, relative to anions; and anion-selective membranes (designated as "a") that preferentially allow anions to pass therethrough, relative to cations. In other preferred embodiments, arrangements such as "c c a c" or "a a c a" may be employed, as discussed in greater detail below. Adjacent compartments may be considered to be in ionic communication therebetween, such as via a neighboring ion selective membrane. Distal compartments may also be considered to be in ionic communication, such as via additional compartments therebetween.

An electrodeionization device may include solid "media" (e.g., electro-active media or adsorption media, such as ion exchange media) in one or more compartments within the device. The electro-active media typically provides a path for ion transfer, and/or serves as an increased conductivity bridge between the selective membranes to facilitate movement of ions within compartments of the device. The media is generally able to collect or discharge ionic and/or other species, e.g. by adsorption/desorption mechanisms. The media may carry permanent and/or temporary electrical charge, and can operate, in some instances, to facilitate electrochemical reactions designed to achieve or enhance performance of the electrodeionization device, e.g., separation, chemisorption, physisorption, and/or separation efficiency. In some cases, at least a portion of the media can have pendent functional groups that bind to one or more target species. Preferably such functional groups facilitate adsorption of the one or more target species. Further preferred functional groups include those that accommodate reversible adsorption and desorption of the one or more target species on the electroactive media. Even more preferred embodiments involve functional groups that adsorb one or more target species under at least one condition or state and desorb at least one of the one or more target species under a different condition or state. Sorption can be effected ionically, covalently or by chemisorption.

Examples of media that may be utilized in accordance with some embodiments of the invention include, but are not limited to, ion exchange media, resins and chelators in formats such as particles, fibers, and membranes. Such materials are known in the art and are readily commercially available. Combinations of any of the above-mentioned formats may be utilized in any one or more of the various embodiments of the invention.

In some embodiments, media employed may generally be an effective conductor of one or more ions. In other embodiments, media employed may generally be a poor conductor of one or more ions. Mixed media, such as a mixture of conductive and poorly conductive media, may be used in at least one embodiment. Some embodiments may also involve a bed of electroactive media with inert components.

In accordance with one or more embodiments, one or more compartments of the electrical separation apparatus can be filled with media such as adsorption media, for example, ion exchange media. At least a portion of the media may generally be ion-selective. The ion exchange media, in some embodiments, can include resins such as cation exchange resin, a resin that preferentially adsorbs cations, or an anion exchange resin, a resin that preferentially adsorbs anions, an inert resin, as well as mixtures thereof. Various configurations may also be practiced. For example, one or more compartments may also be filled with only one type of resin, e.g., a cation resin or an anion resin; in other cases, the compartments may be filled with more than one type of resin, e.g., two types of cation resins, two types of anion resins, a cation resin, and an anion resin. Non-limiting examples of commercially available media that may be utilized in one or more embodiments of the invention include strong acid and Type I strong base resins, Type II strong base anion resin, as well as weak acid or weak base resins commercially available from The Dow Chemical Company (Midland, Mich.). Media may be selective for a specific type of ion, such as a specific cation or anion. For example, media may be boron-selective, nitrate selective or arsenic selective in accordance with one or more embodiments. As noted, such target-selective media can be reversibly adsorptive. As used herein, selective media can bind, e.g. by sorption mechanisms, a species, including ionic species, under a particular condition. Preferably, selective media implementable in some embodiments of the invention can release adsorbed species under a different condition. Target selective media preferentially bind a target species or similar types of target species under a particular condition or a state of the target species and can release, e.g., desorb, the bound species or even one or more of the similar types of species. Selective media differ from ion exchanging media in at least requiring a different condition to release bound species, e.g., one or more target species.

The ion exchange or selective resin typically utilized in the compartments can have a variety of functional groups on their surface regions. The choice of functional group may be based upon the types of ionic species present in the process stream. If a certain target species is present for removal by the electrochemical device, it may be desirable to select a media with a functional group that is capable of preferentially binding the target species. For example, in one non-limiting embodiment in which it is desired to remove boron from water, the media may include at least one cis-diol functional groups. More specifically, the cis-diol functional groups may be embodied as N-methyl glucamine functional groups in accordance with one or more embodiments. In at least one embodiment, N-methyl glucamine functional groups may preferentially bind borate ions in accordance with the following mechanism:

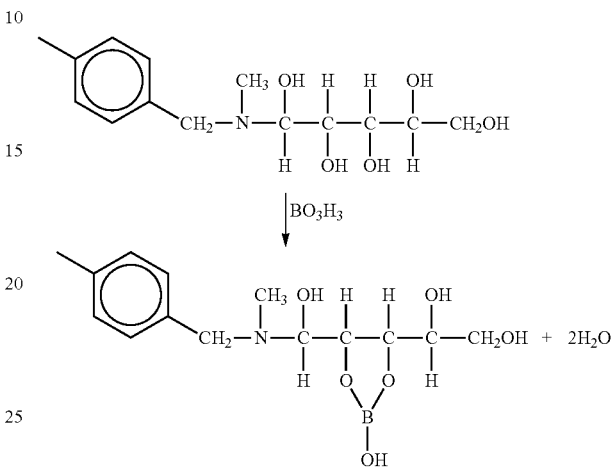

Other functional groups may include, but are not limited to tertiary alkyl amino groups and dimethyl ethanol amine groups. Various media may also be used in combination with ion selective resin materials having other functional groups on their surface regions such as ammonium groups. Other modifications and equivalents that may be useful as ion exchange resin material are considered to be within the scope of those persons skilled in the art using no more than routine experimentation. Examples of ion exchange resin include, but are not limited to, DOWEX® MONOSPHERE™ 550A anion resin, MONOSPHERE™ 650C cation resin, MARATHON™ A anion resin, and MARATHON™ C cation resin and DOWEX BSR-1™ resin all available from The Dow Chemical Company (Midland, Mich.).

As discussed above, it may be desirable to provide mixed media in one or more compartments of an electrochemical device. In one non-limiting embodiment, at least one compartment may contain a mixture or a bed of an anion exchange resin and a target ion selective resin, such as a boron selective resin. Without wishing to be bound by any particular theory, the anion resin may generally facilitate separation via conventional transmembrane transport by conducting one or more anions, such as chloride, while the ion selective resin may adsorb target species, such as boron, for water purification. In this regard, the ion selective resin may generally be a poor conductor. Particular configurations utilizable in various systems and techniques of the invention can involve electrodeionization apparatus comprising one or more compartments having electroactive media consisting essentially of target selective media, such as resin; having a mixed bed of media consisting essentially anion exchange media and target selective media; having a mixed bed of media consisting essentially of cation exchange media and target selective media; or having a mixed bed of media consisting essentially of anion exchange media, cation exchange media, and target selective media.

In accordance with one or more embodiments, various media may be arranged in a variety of configurations within each of the compartments. For example, media such as resins can be arranged in layers so that a number of layers in a variety of arrangements can be constructed. Other embodiments or configurations are believed to be within the scope of the invention including, for example, the use of mixed bed ion exchange resins in any of the depleting, concentrating and electrode compartments, the use of inert resins between layer beds of anion and cation exchange resins, and the use of various types of anionic and cationic resins. A resin may generally be efficient in promoting water splitting in one or more compartments. A resin may also be efficient in increasing electrical conductivity in one or more compartments. A resin may also be efficient in adsorbing one or more target species.

In accordance with one or more embodiments, selection and arrangement of media in a compartment may be based on one or more environmental conditions therein, one or more characteristics of a process stream to be treated therein, or generally by the intended treatment regime therein. In some embodiments a composition of a resin bed in a compartment may be substantially uniform along a flow path through a compartment. In other embodiments, stacking or layering may be desired along a flow path through a compartment. In some embodiments, a process stream may contain a target species which is not likely to be removed by ion selective resin immediately upon introduction to a compartment. For example, the target species may need to be converted to a preferred state, e.g., a state conducive to adsorption, such as an ionic state, for removal. In theses embodiments, ion selective resin may be strategically placed further along a flow path through the compartment. In this way, when the target species does contact the ion selective resin, it is in the preferred state for removal or adsorption by the target selective media. A different media or resin may be positioned upstream of the ion selective resin, such as to transport other ionic species present in the process stream. In some embodiments, this may facilitate the conversion of the target species to a preferred state. For example, adjusting a characteristic of a process stream, such as a pH condition thereof in a compartment, may facilitate the conversion of a target species to a preferred state to facilitate removal from the process stream.

The media contained within the compartments may be present in any suitable shape or configuration, for example, as substantially spherical and/or otherwise shaped discrete particles, powders, fibers, mats, membranes, extruded screens, clusters, and/or preformed aggregates of particles, for example, resin particles may be mixed with a binding agent to form particle clusters. In some cases, the media may include multiple shapes or configurations. The media may comprise any material suitable for adsorbing ions, organics, and/or other species from a liquid, depending on the particular application, for example, silica, zeolites, and/or any one or mixture of a wide variety of polymeric ion exchange media that are commercially available. Other materials and/or media may additionally be present within the compartments that, for example, can catalyze reactions, or filter suspended solids in the liquid being treated.

Further, a variety of configurations or arrangements may exist within the compartments. Thus, one or more compartments of the separation systems of the invention may involve additional components and/or structures such as, but not limited to, baffles, mesh screens, plates, ribs, straps; screens, pipes, carbon particles, carbon filters, which may be used to, in some cases, contain the ion exchange media, and/or control liquid flow. The components may each contain the same type and or/number of the various components and/or be of the same configuration or may have different components and/or structure/configurations.

In accordance with one or more embodiments, a process stream may be supplied to one or more compartments of the electrochemical device. As discussed above, the process stream may include one or more target species or types of target species. A target species may generally be any species that is dissolved and/or suspended in a process fluid, typically a liquid, which is desired to be removed or transferred from a first solution to another solution, typically using an electrical separation device. Examples of target species that are desirably removed or transported between solutions using electrical separation devices may include certain ionic species, organic molecules, weakly ionized substances, and ionizable substances in the operating environment within the device. Target ionic species that are desirably removed or transported in accordance with some aspects of the invention can be one or more ions able to precipitate from solution, and/or are able to react with other species and/or ions in a solution to form salts and/or other compounds that are able to precipitate from solution. In some embodiments, the target species may be a non-precipitatable species or soluble species under conditions during operation of the electrochemical device, generally referring to a species which can be an ionic component thereof that does not readily precipitate from solution, or react with other species and/or ions in a solution to form salts and/or other compounds that precipitate.

A process stream containing one or more target ions may be processed with devices and methods in accordance with one or more embodiments. Isolation and conversion of one or more target ions may be desirable as discussed herein. For example, target species in the process stream may be manipulated by the devices and methods to form a product stream. In some embodiments, the devices and methods may isolate target ions and use them to form or generate a target compound. Thus, the target ions present in the process stream may be precursors of a target compound. In some embodiments, a target compound may be a target ion or species that is in a preferred state for removal by the device. In other embodiments, a target ion may be a precursor to an acid or base product. In at least one embodiment, the process stream may be an aqueous solution, such as a salt solution. The salt solution, or ions thereof, may be a precursor to an acid or base product. In some embodiments, target ions may generally be dissociated in the process stream. In accordance with one or more embodiments, the process stream may provide a source of ionic species, such as a first cationic species and a first anionic species. The first cationic species and/or the first anionic species may be precursors to any acid or base.

In accordance with one or more embodiments, it may be desirable to generate acid and/or base streams in the electrochemical device to facilitate water treatment. Acids and/or bases may be products of the electrochemical devices and methods. Acid and/or base product streams may be generated by the electrochemical devices and methods. In at least one embodiment, acid and/or base products may be concentrated by the electrochemical devices and methods. Any acid or base may be generated as a product stream from one or more ions present in the process stream. In some embodiments, target ions in the process stream supplied to the electrochemical device may be selected based on a desired product stream. Generation of acid and/or base streams in an electrochemical device may be involved in promoting or establishing one or more pH conditions or pH environments therein. Promotion of various pH conditions may facilitate water treatment as disclosed herein. In at least one embodiment, a first pH condition may promote adsorption of a target species by media in a compartment of an electrochemical device. A second pH condition may promote desorption thereof.

Temperature may also be coincidentally utilized, e.g., with differences in pH conditions, to facilitate binding at least a portion of the one or more target species or types of target species and, further, to facilitate release of at least a portion of the one or more bound target species or types of target species. For example, the stream having target species therein can be introduced into the one or more devices and systems of the invention at a first temperature, and a releasing stream can have a lower or higher temperature to facilitate release or desorption of the one or more bound target species or types of target species.

In accordance with one or more embodiments, an aqueous solution to be processed may be introduced into an electrodeionization device from a source or point of entry. A conduit may serve as a manifold fluidly connecting a process stream source to one or more compartments of one or more electrodeionization devices. The source of process fluid may typically be fluidly connected to at least one compartment of the electrochemical device. In some embodiments, process water may be introduced to a first compartment and a second compartment of the electrochemical separation device.

In some embodiments, a portion of the process stream may be dissociated into hydrogen or hydronium and hydroxyl ions to facilitate acid or base generation by the electrochemical device. In some embodiments, the applied electric field in the electrodeionization device creates a polarization phenomenon, which typically promotes the splitting or dissociation of water into hydronium and hydroxyl ions. In accordance with one or more embodiments, this water splitting may provide a source of a first anion and a source of a first cation. The electrochemical device may promote migration of ions such that the first anion and the first cation may associate with a second cation and a second anion, respectively, from the process stream to produce one or more product streams as discussed herein.

In accordance with one or more particular aspects, the invention can relate to methods, systems, and devices for inducing migration of components of ionized species such as minerals, salts, ions and organics under the influence of an applied force from a first compartment to a second compartment of an electrochemical device. For example, ions may migrate to or from supplied process fluid to produce one or more product streams. In some aspects, liquid in a first compartment may be desired, i.e., a product, while liquid in a second compartment may be discarded as a reject.

Some embodiments pertain to treating or converting one or more aqueous solutions or process streams to provide, for example, one or more product streams. Product streams may be generated, isolated, aggregated or concentrated. One or more embodiments directed to treating aqueous solutions can involve purifying the aqueous solution to remove one or more undesirable species therefrom. Thus, a product stream may be a purified stream. A product stream, such as an acid or base stream, may be generated by the electrochemical device from one or more precursors supplied thereto. One or more embodiments of techniques can comprise providing an aqueous solution to be processed by removing or migrating one or more species therefrom. The one or more species to be removed or migrated can be one or more cationic and/or one or more anionic species present in the feed stream. The techniques can further comprise introducing an aqueous solution comprising, for example, a first cation and an associated first anion into one or more compartments of an electrical separation apparatus such as any of the configurations of electrically-driven devices discussed herein. One or more target species can be induced or promoted to migrate from the aqueous solution into one or more compartments of the isolating or separation apparatus. One or more target species can be induced or promoted to adsorb from the aqueous solution to media in one or more compartments of the isolating or separation apparatus.

In operation, a process stream, typically having dissolved cationic and anionic components, may be introduced into one or more compartments of an electrochemical device. An applied electric field across the electrodeionization device promotes migration of ionic species in a direction towards their respective attracting electrodes. Under the influence of the electric field, cationic and anionic components leave one compartment and migrate to another. Media or resin contained in one or more compartments may facilitate migration. Some media or resin contained in one or more compartments may also selectively bind or adsorb ions, such as a target species, present in the process stream. Ion selective membranes may block migration of the cationic and anionic species to the next compartment. Thus, one or more products generated, at least in part, by association of one or more ionic species within the electrochemical device may become concentrated in one or more compartments thereof. Product streams may exit via outlets associated with the various compartments. A depleted stream may also exit via a compartment outlet.

Migration of one or more cationic and/or anionic species between adjacent compartments may alter a pH environment in those compartments. In some embodiments, migration of charged species may facilitate polarization which may lead to lower or higher pH conditions. For example, migration of anionic species, such as chloride ions from a first compartment to a second compartment may promote an elevated pH condition in the first compartment and a lowered pH condition in the second compartment. In accordance with one or more embodiments, process water can be electrolyzed in one or more compartments to produce a hydrogen species and a hydroxide species. Where sufficient amounts of such species are provided and transport or migrate, a first compartment can be rendered basic such that liquid contained or flowing therein has a pH of greater than about 7 pH units. Likewise, a second compartment can be rendered to be acidic such that liquid contained or flowing therein has a pH of less than about 7 pH units. Target ions from a supplied process stream may also migrate. Thus, some embodiments provide generation of an acid stream and/or generation of a basic stream. One or both may be discarded, recovered or recycled, as desired.

In accordance with one or more embodiments, altered pH conditions may also contribute to the functioning of the electrochemical separation device for water treatment. In some embodiments, an elevated pH condition may facilitate the conversion of one or more target species present in the process water to a preferred ionic state for electrochemical removal. For example, in one non-limiting embodiment, boron-containing compounds may be converted to borate ions at an elevated pH condition. These borate ions may be bound or adsorbed to functional groups on boron-selective media in a compartment of the electrochemical device. Likewise, a lowered pH condition may be promoted in a compartment containing the boron-selective media having boron compounds adsorbed thereto to regenerate the media. For example, upon saturation of the boron-selective media, polarization of an electrical field applied to the electrochemical device may be reversed to facilitate regeneration of the media. In this way, operation may therefore be cyclical as described below with reference to FIG. 1.

FIG. 1 represents an electrochemical device 100 in accordance with one or more embodiments of the present invention. Device 100 includes a first compartment 110 and a second compartment 120. First compartment 110 is at least partially bound by a first anion selective membrane 140 and a first cation selective membrane 130. Second compartment 120 is at least partially bound by a second cation selective membrane 150 and the first anion selective membrane 130. Second compartment 140 is at least partially bound by a second cation selective membrane 150 and the first anion selective membrane 130. A source of process water 160 is fluidly connected to at least one of the first and second compartments 110, 120. In the non-limiting embodiment depicted, the process water comprises seawater. Under the influence of an applied electric field, chloride ions (Cl⁻) migrate from the first compartment 110 to the second compartment 120 across the first anion selective membrane 140 while sodium ions are captured in the first compartment 110. Under favorable operating conditions, water is split at least at the first cation selective membranes 130. The result is a change of condition, e.g., an elevated pH condition in the first compartment 110. A corresponding lowered pH condition may result in the second compartment 120, for example, due to the generation and, in some cases, migration therein of chloride ions and hydronium ions. Both first and second compartments 110, 120 at least partially contain an ion selective media bed 170, 180 respectively. In the non-limiting embodiment depicted, the media bed 170 comprises a 50/50 blend of anion exchange resin and boron selective resin. At an elevated pH condition in compartment 110, for example a pH in a range of about 9 to 10 in some non-limiting embodiments as least a portion of target compounds, such as, boron-containing compounds, in the process water are converted to a preferred state or condition, such as a preferred ionic state, namely as borate ions. At least a portion of one or more target species, e.g. borate ions, are selectively bound or adsorbed by the target-selective media in media bed 170 in the first compartment 110.

The lowered pH condition in the second compartment 120 may facilitate regeneration of the resin bed 180 therein. For example, in some non-limiting embodiments boron may be released at a pH level in a range of about 2-4 in the second compartment 120. A product stream of purified water is collected at an outlet of the first compartment 110 which has served as a depleting compartment. This product stream may be a basic product stream. A reject stream is collected at an outlet of the second compartment 120 which has served as a concentrating compartment. Bed 180 can comprise a 50%/50% by volume blend of anion exchange resin and target selective resin.

The polarity of the applied electric field can be reversed at any time so as to adsorb at least a portion of one or more target species, e.g., borate ions, on the resin bed 180 in the second compartment 120 while regenerating the resin bed 170 in the first compartment 110. In this way, the second compartment 120 can serve as a depleting compartment while the first compartment 110 can serve as a concentrating compartment.

As illustrated, at least a portion of product stream exiting from compartment 110 can be directed to a third compartment 190 of the electrochemical device. The product stream from compartment 110 can be further treated in compartment 190 by adjusting or modifying at least one property or characteristic thereof. In further advantageous aspects of the invention, compartment 190 can modify or adjust at least one other characteristic or property of a stream introduced thereinto. For example, the product stream can be treated to remove any remaining ionic species therein. Treatment or removal can be effected under the influence of the applied electric field. Thus, as illustrated, cationic species migration can be induced from the stream and into compartment 120. In at least this particular embodiment compartment 190 can be considered as at least a depleting compartment. In still other cases, at least a portion of water in the stream introduced into compartment 190 can be polarized to produce hydronium and hydroxide ions, typically as a result of the applied electric current. As illustrated, the generated hydronium ions can migrate into the stream and adjust the pH level thereof. Thus in at least this aspect, compartment 190 can be considered as a pH adjusting compartment, and, in cases where the stream introduced thereinto has a high pH level, e.g., greater than 7 units, compartment 190 can be considered as a pH neutralizing compartment, that provides an exiting stream having a lower pH, relative to the pH value at the inlet.

Configurations of compartment 190 can involve components that facilitate transport of the migrating species as well as polarization of water. For example, compartment 190 can be defined by cation selective membrane 150 and a third cation selective membrane 155. In some cases, membrane 155 can be at least partially a bipolar membrane that at least partially facilitates polarization of water. Further embodiments can involve compartment 190 having electroactive media, which can be a mixed bed of anionic and cationic exchange resins.

Device 100 can involve a plurality of compartment 190. Such arrangements may be advantageously utilized if a plurality of such compartments may be needed to adjust the pH of the product stream (from device 100) to a desired value. As noted, FIG. 1 exemplarily illustrates a device 100 with one or more neutralizing compartments 190. Neutralization a pH adjustment of stream from compartment 110 may, however, be effected through further notable configurations and aspects of the invention. For example, the pH of at least a portion the stream from compartment 190 can be lowered by introducing it into at least one cathode compartment of device 100. Thus, for example, hydronium species migrating from compartment 110 or, preferably, generated at a bipolar membrane that at least partially defines the cathode compartment (not shown). In other cases, pH adjustment can be performed to a target level by addition of an acid at a point external of device 100. The acid solution utilized for neutralization can be generated by device 100 or an ancillary module (not shown) unattached or independently operable of device 100.

Purified water may be sent for use or storage as potable water. Potable water may be preserved or further disinfected, if desired, and may find use in various applications including agriculture and industry, such as for semiconductor fabrication. A reject or concentrate stream produced by the electrochemical device may be collected and discharged to waste, recycled through the system, or fed to a downstream unit operation for further treatment. Product streams may be further processed prior to downstream use, upstream use, or disposal. For example, a pH level of a product acid or product base stream may be adjusted. In some embodiments, it may be desirable to mix, in part or in whole, one or more product streams. One or more additional unit operations may be fluidly connected downstream of the electrochemical unit. For example, one or more unit operations may be configured to receive and process a target product stream, such as before delivering it to a point of use. Polishing units, such as those involving chemical or biological treatment, may also be present to treat a product or effluent stream of the device prior to use or discharge. In some embodiments directed to systems of the invention, a reverse osmosis unit operation is not positioned downstream of the electrochemical separation device. In at least one embodiment directed to systems of the invention, an ion selective resin bed, such as a boron-selective resin bed, is not positioned downstream of the electrochemical separation device.

In accordance with one or more embodiments, one or more sensors may be positioned to detect one or more characteristics, conditions, properties or states of any stream, component or subsystem generally associated with device 100. In some non-limiting embodiments, one or more of the sensors may be configured to detect a concentration of a target species in a stream entering or exiting device 100. In one embodiment, one or more sensors may be positioned to detect a boron concentration at an inlet and/or an outlet of one or more compartments of device 100. In another non-limiting embodiment, one or more sensors may be positioned to detect a pH level at an inlet and/or an outlet of one or more compartments of device 100.

In some embodiments, devices and methods involve a controller for adjusting or regulating at least one operating parameter of the device or a component of the system, such as, but not limited to, actuating valves and pumps, as well as adjusting a property or characteristic of a current or an applied electric field through the electrically driven separation device. Controller may be in electronic communication with at least one sensor configured to detect at least one operational parameter of the system. The controller may be generally configured to generate a control signal to adjust one or more operational parameters in response to a signal generated by a sensor. For example, the controller can be configured to receive a representation of a condition, property, or state of any stream, component or subsystem of device 100, or from device 100. The controller typically includes an algorithm that facilitates generation of at least one output signal which is typically based on one or more of any of the representation and a target or desired value such as a set point. In accordance with one or more particular aspects of the invention, the controller can be configured to receive a representation of any of a measured property of any stream from device 100, and generate a control, drive or output signal to any of the treatment system components, including device 100, to reduce any deviation of the measured property from a target value.

In accordance with one or more embodiments, a controller may be configured to reverse polarity of an electric current applied through device 100. The controller may be in communication with one or more sensors configured to provide a measurement signal which is representative of a concentration of a target species in a stream associated with device 100, for example, a product stream exiting a compartment of device 100. In some embodiments, a pH level or a concentration measurement may be detected by a sensor and communicated to the controller. In at least one embodiment, a measurement signal representative of a boron concentration may be transmitted to the controller. The controller may be configured to generate a control signal in response a received measurement being above or exceeding a predetermined level. The control signal may reverse polarity of an electric current applied through device 100 so as to regenerate media in a compartment therein. In some embodiments, the control signal may be sent to a power supply associated with the device 100 based at least partially on the measurement signal.

In other configurations, the controller can be in open-loop control, providing or changing one or more operating conditions of at least one component of the treatment systems of the invention. For example, the controller can periodically generate output or drive signals, typically according to a predefined schedule, that reverses the polarity of the applied electric field, and preferably, the stream flow paths through device 100, from a predetermined arrangement to a second predetermined arrangement.

One or more sensors utilizable in the systems and methods of the invention can provide a representation of a property or characteristic of a stream into, from, or within device 100, or a property or characteristic of a current applied through device 100. For example, the one or more sensors can be configured to measure and provide a representation, e.g., a measured signal, of a process condition such as the pH of any stream exiting any of compartments 110, the pH of the stream exiting compartment 120, and the pH of the stream exiting compartment 190. The one or more sensors can also provide measured conductivity or resistivity values of any of the streams into, from or within device 100. In particularly advantageous configurations, at least one sensor can be utilized to provide a representation, by direct measurement or by proxy, of the concentration of at least one target species, e.g., boron, in the product stream from device 100, or from any of compartments 110 and 120. Measurement of the boron concentration can be effected by, for example, colorimetric or fluorophoretic techniques wherein samples are batch-wise periodically retrieved and analyzed, or analyzed semi-continually through one or more side streams.

The controller is typically a microprocessor-based device, such as a programmable logic controller (PLC) or a distributed control system, that receives or sends input and output signals to and from components of the device or system in which the device is operative. Communication networks may permit any sensor or signal-generating device to be located at a significant distance from the controller or an associated computer system, while still providing data therebetween. Such communication mechanisms may be effected by utilizing any suitable technique including but not limited to those utilizing wireless protocols.

In at least one embodiment, one or more bipolar membranes may be incorporated to at least partially define one or more compartments. Bipolar membranes are generally anionic membranes on one side and cationic on the other. Bipolar membranes may be generally efficient in splitting water. In some embodiments, bipolar membranes can be used in the place of a water splitting cell. In some embodiments, one or more bipolar membranes may be used in conjunction with one or more anion and/or cation selective membranes. In accordance with one or more embodiments, an electrochemical device may include an alternating series of bipolar membranes and anion selective membranes. Likewise, an electrochemical device may include an alternating series of bipolar membranes and cation selective membranes in accordance with one or more embodiments. Those ordinarily skilled in the art would recognize that, in accordance with certain aspects of the invention, other types and/or arrangements of selective membranes can also be used. In at least one embodiment, an electrochemical device does not include a bipolar membrane.

In accordance with some embodiments, a plurality of stages in a treatment system can be utilized to purify water or at least reduce the concentration of dissolved solids therein. For example, water to be treated can be purified in stages such that each stage selectively removes one or more types of dissolved solids thereby producing purified, e.g., desalted or even potable, water. In some embodiments, multiple treatment stages may be present in a single electrochemical device. In other embodiments, various treatment stages may be present in a series of electrochemical devices. In some cases, one or more stages can comprise one or more unit operations that effects selective retention of a type of dissolved species, which can then be removed in one or more subsequent or downstream stages. Thus, in some embodiments of the purification system of the invention, a first stage can remove or at least reduce the concentration of one type of dissolved species. In other embodiments, the first stage can remove or reduce the concentration of all but one type of dissolved species. Any retained species, not removed from the water, can then be removed or the concentration thereof reduced in one or more subsequent stages.

The electrochemical devices may be operated in any suitable fashion that achieves the desired product and/or effects the desired treatment. For example, the various embodiments of the invention can be operated continuously, or essentially continuously or continually, intermittently, periodically, or even upon demand. Multi-pass EDI systems may also be employed wherein feed is typically passed through the device two or more times, or may be passed through an optional second device. An electrical separation device may be operatively associated with one or more other units, assemblies, and/or components. Ancillary components and/or subsystems may include pipes, pumps, tanks, sensors, control systems, as well as power supply and distribution subsystems that cooperatively allow operation of the system.

It should be understood that the systems and methods of the present invention may be used in connection with a wide variety of systems where the processing of one or more liquids may be desired. Thus, the electrical separation device may be modified by those of ordinary skill in the art as needed for a particular process, without departing from the scope of the invention.

The function and advantages of these and other embodiments will be more fully understood from the following non-limiting example. The example is intended to be illustrative in nature and is not to be considered as limiting the scope of the embodiments discussed herein.

EXAMPLE

Several treatment techniques were studied for their applicability to boron removal from seawater as presented below.

The ED and EDI cells which were experimentally used had 1.2×7.5 inch effective membrane area. IONPURE® anion- and cation-selective membranes were used throughout, but for Tokuyama Soda ACS and CMS monovalent-selective membranes implemented in the monovalent-selective ED experiment. The resin used was DOWEX® MSA resin and/or DOWEX® BSR-1 boron-selective resin. The electrodes were $RuO_2$ coated expanded titanium metal and were fed with separate streams of the same water. Screen filler was contained in the electrode compartments. INSTANT OCEAN® salt, dissolved in deionized water, was used as the feed to simulate seawater unless otherwise indicated. Boric acid was added in some experiments. Boron concentration was measured throughout using the Hach Azomethine-H method 10061 (0.02–1.50 ppm as boron). Each measurement was an average of three samples.

Figure 2:
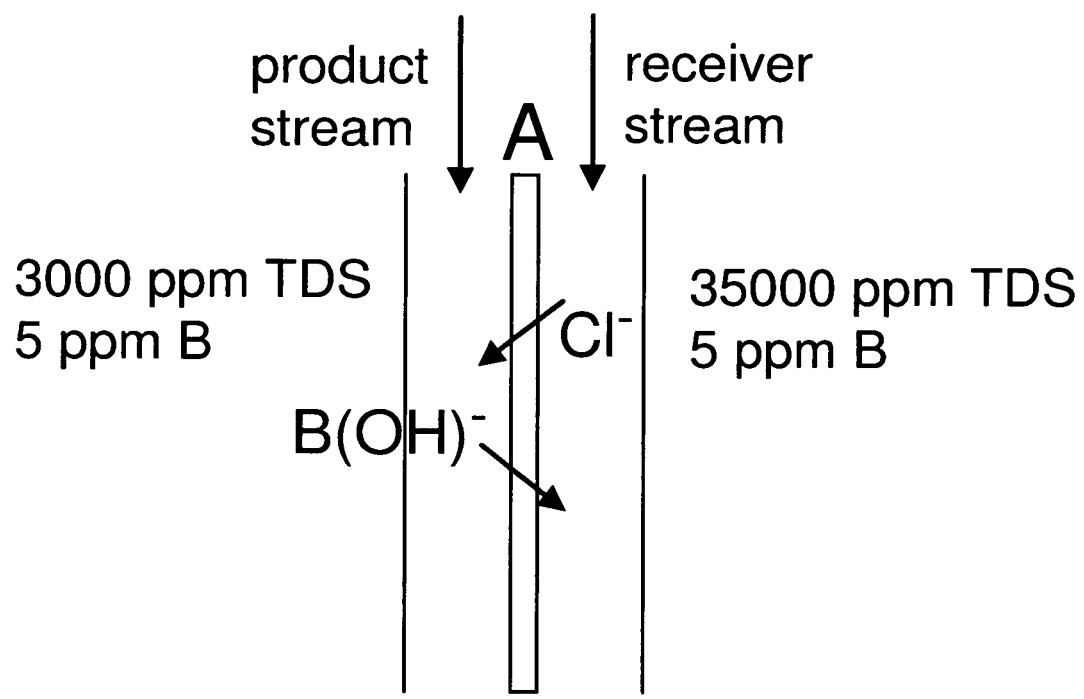
FIGS. 2-4 present experimental setups referenced in the accompanying Example.

A Donnan Dialysis treatment process was performed in accordance with the experimental setup presented in FIG. 2. Water desalinated by an ED (not shown) was used as feed, and water concentrated by the ED was used as a receiving solution. The results are summarized below in Table 1.

TABLE 1

Donnan Dialysis

|  | Flow rate, ml/min/cell | B, ppm |
| --- | --- | --- |
| Product in | 7.3 | 5.1 |
| Product out |  | 5.0 |
| Receiver in | 3.7 | 6.1 |
| Receiver out |  | 6.1 |

An electrodeionization approach was also tested. In these experiments, a voltage of 5 V per cell pair was applied. Feed water was fed at a flow rate of 10 nil/min per cell with a boron concentration of 3.6 ppm. In a first setup, IONPURE® ion-selective membranes were used with DOWEX® MSA anion-exchange resin as a filler. In a second setup, IONPURE® ion-selective membranes were used with BSR-1-boron-selective resin as a filler. The results are summarized below in Table 2 for feed streams at pH ranging from 7.5 to 10.8 units.

TABLE 2

Electrodeionization

| Resin | pH 7.5 | pH 8.9 | pH 10.0 | pH 10.8 |
| --- | --- | --- | --- | --- |
| MSA | No removal | 24% | 33% | 19.4% |
| BSR-1 | No removal | No removal | 26% | — |

In another experiment, electrodialysis with a monovalent-selective anion membrane was tested with a feed at a pH level of 7.5. The data is presented below in Table 3 for various applied electric currents.

TABLE 3

Electrodialysis with monovalent-selective anion membrane

| Voltage | V/cell pair | 2 | 2 | 5 | 5 |
| --- | --- | --- | --- | --- | --- |
| Current | A | 1 | 0.5 | 1 | 0.47 |
| Feed | mS/cm | 45.95 | 22.96 | 22.96 | 12.20 |
| Product | mS/cm | 41.63 | 20.65 | 17.77 | 9.80 |
| Feed boron | ppm | 3.62 | 1.57 | 1.57 | 0.82 |
| Product boron | ppm | 3.75 | 1.67 | 1.63 | 0.80 |
| Product flow | ml/min per cell | 9.7 | 9.7 | 7.3 | 10.6 |
| Salt removal | % | 9.4 | 10.1 | 22.6 | 19.7 |
| Boron removal | % | none | none | none | 2.4 |

Figure 3:
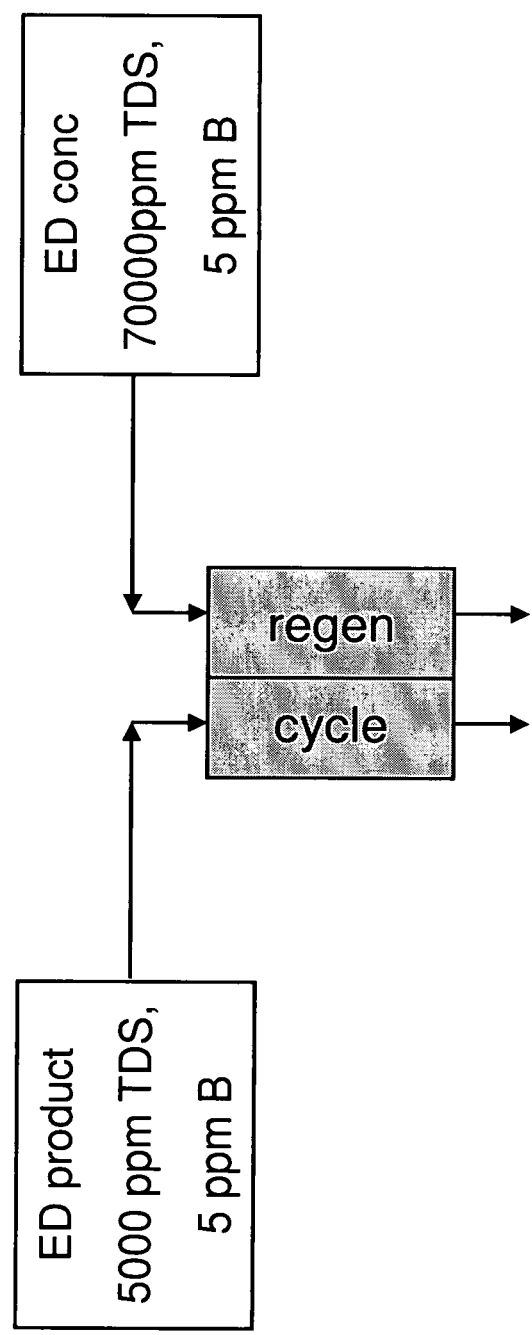

An experiment was also performed using ion exchange with columns non-selective resins in accordance with the setup presented in FIG. 3. Two identical resin beds (Dow MSA) were used cyclically, synchronized with ED polarity reversal. Water desalinated by ED was used as feed, and water concentrated with ED was used as regenerant. The results are summarized below in Table 4.

TABLE 4

Ion exchange with non-selective resin

| Volume of treated water, BV | Number of cycles | Removal |
| --- | --- | --- |
| 5 | 1 | 64% |
| 7 | 20 | No removal |
| 11 | 10 | No removal |

Figure 4:
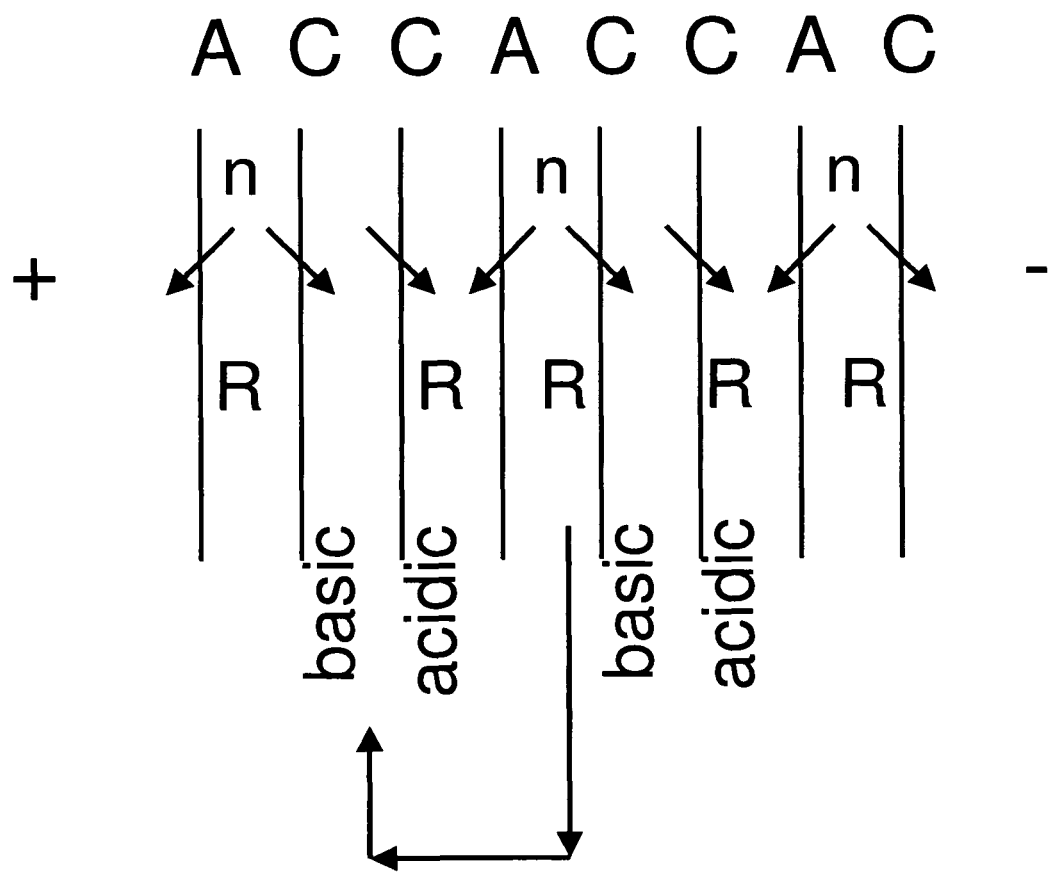

An acid/base generating EDI with boron-selective resin as depicted in FIG. 4 was tested in accordance with one or more embodiments of the present invention. IONPURE® ion-selective membranes were used, and the resin comprised 50%

Figure 5:
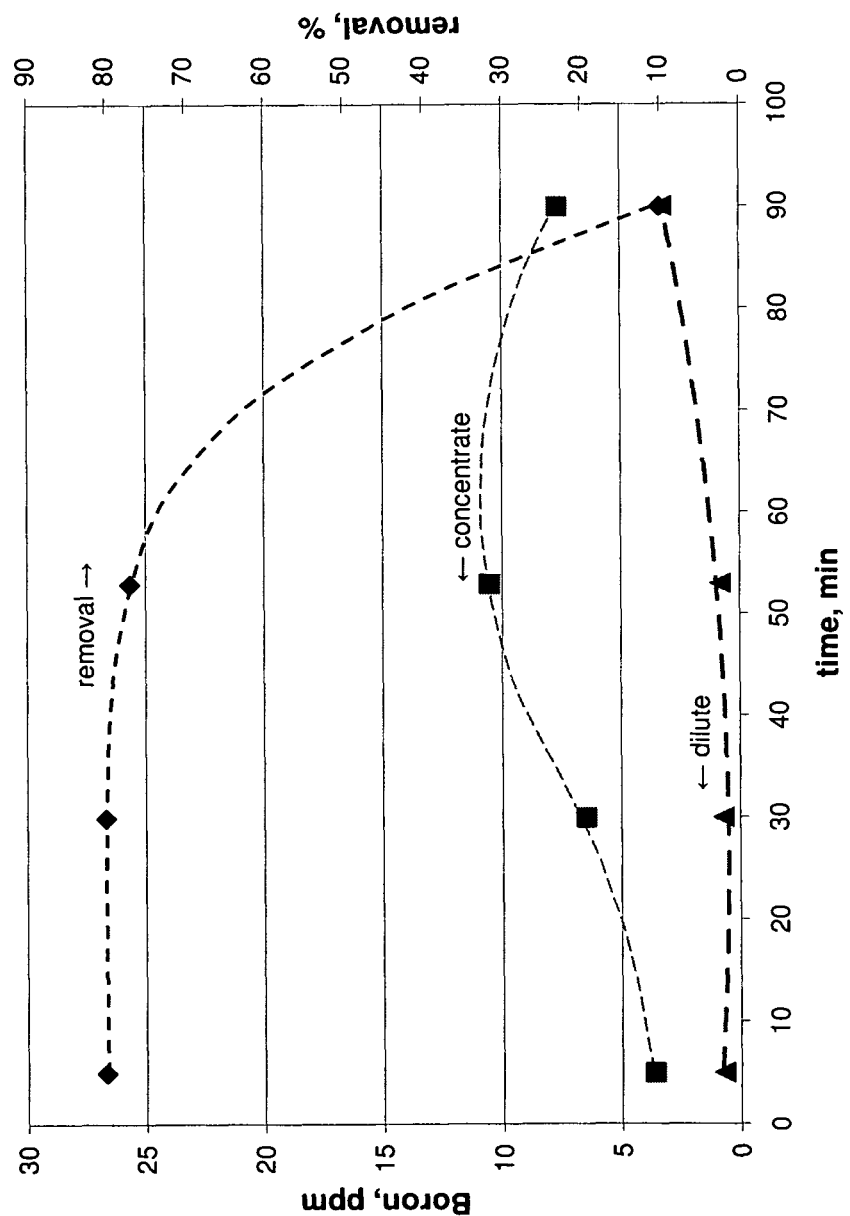
FIG. 5 presents data discussed in the accompanying Example in accordance with one or more embodiments.

BSR-1 resin and 50% Dow Marathon® A anion-exchange resin. Compartments CA and AC were fed with simulated seawater. Compartment CC was fed with the effluent of the AC compartment. In the AC compartment the solution became basic and the BSR-1 resin adsorbed boron. In the CA compartment the solution was acidified and the BSR-1 resin therein was regenerated. By switching the streams and reversing the polarity, cyclic operation was achieved. The module was cycled four times. In the fourth cycle, after 5 minutes operation, all the effluent was collected for 25 min and analyzed for boron (both product and concentrate). All the effluent for the next 23 min was also collected and analyzed. The third sample was grabbed at 90 min. Table 5 represents average removal over 48 min. The results are summarized in Tables 5 through 7 presented below. Table 6 presents boron data for cycle 4. FIG. 5 presents a time profile of boron removal by the acid/base generating EDI containing boron-selective resin.

TABLE 5

Acid/base generating EDI with boron-selective resin

| | |
|---|---|
| Feed boron | 3.6 ppm |
| Product boron | 0.72-0.82 ppm |
| Reject boron | 6.5-10.5 ppm |
| Current | 2 A |
| Voltage | 4 V/dilute cell |
| Product flow rate per cell | 2.1 |
| Concentrate flow rate per cell | 1.3 |
| Total volume of treated water | 26 BVH |
| Concentrate pH | 1.4-2.1 |
| Removal | 77-80% |
| Mass balance for B | ~100% |

TABLE 6

Acid/base generating EDI with boron-selective resin

| pH | Boron removal |
|---|---|
| 7.5 | No removal |
| 9 | No removal |
| 10 | 26% |

TABLE 7

Acid/base generating EDI with boron-selective resin

| | |
|---|---|
| Feed | 3.6 ppm |
| Product | 0.72-0.82 ppm |
| Reject | 6.5-10.5 ppm |
| Removal | 77-80% |
| Mass balance for B | ~100% |

Donnan dialysis, ED and CDI processes were not efficient in removing boron from sea water at neutral pH. At elevated pH some boron removal was achieved by ED and EDI modules. This was likely because at pH of about 7.5, boric compounds are not ionized, and therefore cannot be moved by an applied electric field. At elevated pH boric acid converts to borate ion $B(OH)_4^-$, which is moved by the electric field. At pH 9-10 some removal was achieved by EDI. At even higher pH (~11) the removal rate went down, possibly due to competition from $OH^-$ ions, which are more mobile in the ion-exchange resins and membranes. Ion-exchange on boron-selective resin was efficient in boron removal from sea water. Boron-selective resin was found to be regenerable with relatively weak acid (pH=2-4).

EDI with boron-selective resin was less efficient in removing boron than EDI with non-selective resin. This indicates that boron-selective resin may not be a good conductor of borate ions. The mechanism of boron adsorption on this resin is very different from a regular anion-exchange resin. It is likely that boron-selective resin did not contribute to boron removal in the EDI device, and the stack was essentially working as an ED device. Electrodialysis with membranes, selective for monovalent anions and cations, was not efficient for boron removal at neutral pH. The shift in equilibria between divalent and monovalent ions in the vicinity of the membranes was likely not sufficient to change the local pH in order to ionize boric acid. Sea water is a natural buffer solution, where buffering effect is created by carbonates, sulfates and borates.

Figure 6:
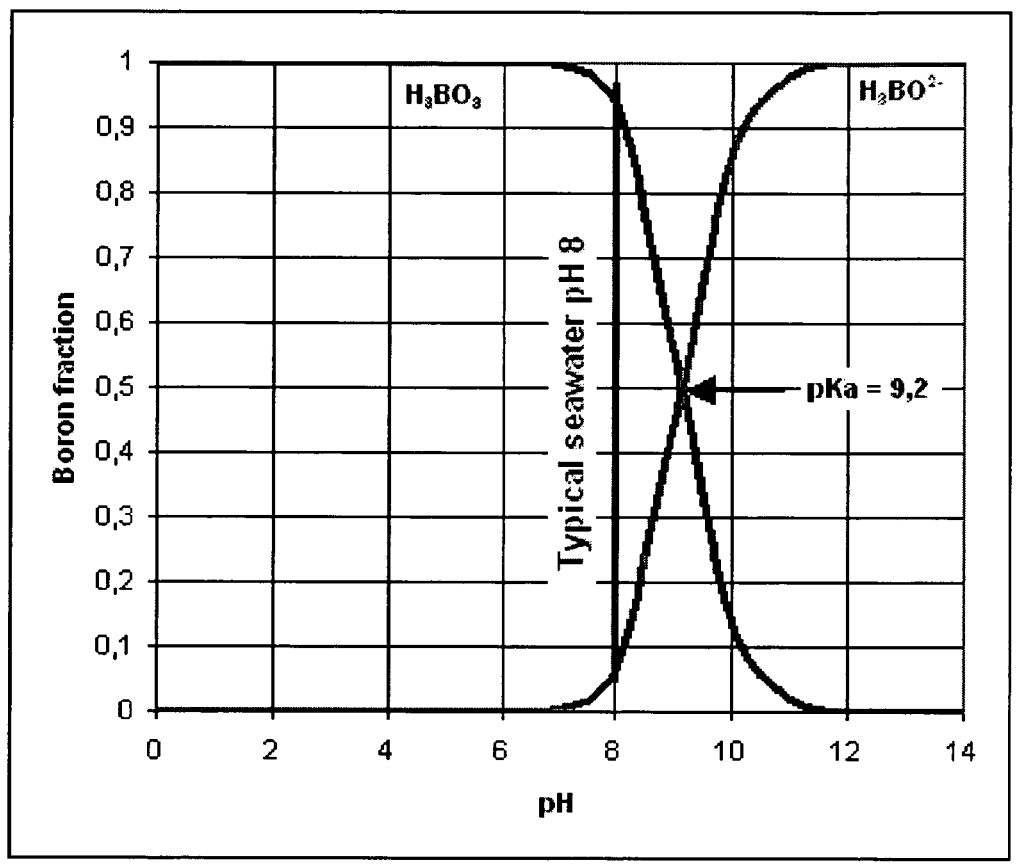
FIG. 6 presents an equilibrium relationship between boron species at varying pH levels.

The best results were obtained by an approach involving ion-exchange with boron-selective resins which were regenerated with acidic effluent or acidified stream of a specifically configured EDI or ED module in accordance with one or more embodiments of the present invention. In this approach, equilibrium among boron species at varying pH levels, as presented in FIG. 6, may be used to achieve superior boron removal. Thus, some aspects of the invention involve modifying a pH condition of a stream to be treated in an electrically driven separation apparatus to at least the $pK_a$, i.e., about 9.2 at about 25° C., of the boric acid/borate ion according to the relationship:

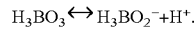

Preferably, the pH condition of the stream to be treated is at least about 9.5, even more preferable is an increase to a pH of at least about 10, to further promote formation of the cis-diol-binding borate species. Further aspects of the invention involve modifying the pH condition of one or more other streams in the separation device to below the $pK_a$ of boric acid/borate ion, e.g., pH of less than about 9. The dominant form of boron species, for example, boric acid or borate ion, may depend on the pH level of the process stream. Boron-selective resin, equilibrated with boron-containing solution, could start releasing boron when rinsed with a very weak acid (pH 2-4). This acidity could be achieved by an acid/base generating CDI module. Although flow rates in the acid/base generating CDI experiment were low, the total volume of treated water was 26 BVH, which is a reasonable number and the flow rates can be increased. Alternatively, a CDI device (or an ED device of the same membrane configuration) may be used only for generating acid, while this acid can be supplied to regenerate a resin bed of boron-selective resin. The CDI device can be fed with sea water, or with the product of desalination process, whichever proves to be more suitable for generation of acid and base. It should be possible to run the acid/base generating device with much higher flow rate in the basic compartment. In this case, the pH shift in the basic compartment may be insignificant, which allows the use of this stream without neutralization for a downstream process. At the same time, the acid may be produced at a concentration needed for resin regeneration. The results indicate that the EDI module with acid/base generation and boron-selective resin successfully reduced boron concentration in the solution. Application of a longer residence time to a solution undergoing treatment, such as may be accomplished by using a larger bed volume, will result in a greater reduction of boron concentration in the solution, for example, to a level below 0.5 ppm in at least some embodiments.

Having now described some illustrative embodiments of the invention, it should be apparent to those skilled in the art that the foregoing is merely illustrative and not limiting, having been presented by way of example only. Numerous modifications and other embodiments are within the scope of one of ordinary skill in the art and are contemplated as falling within the scope of the invention. In particular, although many of the examples presented herein involve specific combinations of method acts or system elements, it should be understood that those acts and those elements may be combined in other ways to accomplish the same objectives.

Those skilled in the art should appreciate that the parameters and configurations described herein are exemplary and that actual parameters and/or configurations will depend on the specific application in which the systems and techniques of the invention are used. Those skilled in the art should also recognize or be able to ascertain, using no more than routine experimentation, equivalents to the specific embodiments of the invention. It is therefore to be understood that the embodiments described herein are presented by way of example only and that, within the scope of the appended claims and equivalents thereto; the invention may be practiced otherwise than as specifically described.

Moreover, it should also be appreciated that the invention is directed to each feature, system, subsystem, or technique described herein and any combination of two or more features, systems, subsystems, or techniques described herein and any combination of two or more features, systems, subsystems, and/or methods, if such features, systems, subsystems, and techniques are not mutually inconsistent, is considered to be within the scope of the invention as embodied in the claims. Further, acts, elements, and features discussed only in connection with one embodiment are not intended to be excluded from a similar role in other embodiments.

As used herein, the term "plurality" refers to two or more items or components. The terms "comprising," "including," "carrying," "having," "containing," and "involving," whether in the written description or the claims and the like, are open-ended terms, i.e., to mean "including but not limited to." Thus, the use of such terms is meant to encompass the items listed thereafter, and equivalents thereof, as well as additional items. Only the transitional phrases "consisting of" and "consisting essentially of," are closed or semi-closed transitional phrases, respectively, with respect to the claims. Use of ordinal terms such as "first," "second," "third," and the like in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

What is claimed is:

1. An electrically driven separation device, comprising:
a first compartment at least partially defined by a first cation selective membrane and a first anion selective membrane;
a second compartment at least partially defined by the first anion selective membrane and a second cation selective membrane;
a third compartment at least partially defined by the second cation selective membrane and by a bipolar membrane; and
borate-selective electroactive media located in at least one of the first and second compartments.

2. The device of claim 1, wherein an outlet of the electrically driven separation device is fluidly connected to a potable point of use.

3. The device of claim 1, wherein the electroactive media comprises cis-diol functional groups.

4. The device of claim 1, wherein the third compartment is substantially free of electroactive media.

5. The device of claim 1, wherein no reverse osmosis membrane is fluidly connected downstream of the electrically driven separation device.

6. The device of claim 1, wherein no resin bed is fluidly connected downstream of the electrically driven separation device.

7. The device of claim 1, further comprising a sensor positioned in fluid communication downstream of the resin bed and configured to provide a measurement signal representative of a concentration of boron in the treated water from the electrically driven separation device.

8. The device of claim 1, further comprising a sensor positioned in fluid communication downstream of the resin bed and configured to provide a measurement signal representative of a detected pH level.

9. The device of claim 7, further comprising a controller in communication with the sensor and configured to produce a control signal to a power supply associated with the electrically driven separation device based at least partially on the measurement signal.

10. The device of claim 3, wherein the electroactive media comprises N-methyl glucamine functional groups.

11. The device of claim 1, wherein at least one of the first compartment and the second compartment comprises a 50/50 blend of the borate-selective media and an anion exchange media.

12. An electrically driven separation device, comprising:
a first compartment at least partially defined by a first cation selective membrane and a first anion selective membrane;
a second compartment at least partially defined by the first anion selective membrane and a second cation selective membrane;
a third compartment at least partially defined by the second cation selective membrane; and
borate-selective electroactive media located in at least one of the first and second compartments,
the device comprising an outlet of the first compartment fluidly connected to an inlet of the third compartment.

13. The device of claim 12, wherein at least one of the first compartment and the second compartment comprises a 50/50 blend of the borate-selective media and an anion exchange media.

14. The device of claim 12, wherein an outlet of the electrically driven separation device is fluidly connected to a potable point of use.

15. The device of claim 12, wherein the electroactive media comprises cis-diol functional groups.

16. The device of claim 12, wherein the third compartment is substantially free of electroactive media.

17. The device of claim 12, wherein no reverse osmosis membrane is fluidly connected downstream of the electrically driven separation device.

18. The device of claim 12, wherein no resin bed is fluidly connected downstream of the electrically driven separation device.

19. The device of claim 12, further comprising a sensor positioned in fluid communication downstream of the resin bed and configured to provide a measurement signal representative of a concentration of boron in the treated water from the electrically driven separation device.

20. The device of claim 12, further comprising a sensor positioned in fluid communication downstream of the resin bed and configured to provide a measurement signal representative of a detected pH level.

21. The device of claim 19, further comprising a controller in communication with the sensor and configured to produce a control signal to a power supply associated with the electrically driven separation device based at least partially on the measurement signal.

22. The device of claim 3, wherein the electroactive media comprises N-methyl glucamine functional groups.

* * * * *